US011909092B2

(12) United States Patent
Verwoerd

(10) Patent No.: US 11,909,092 B2
(45) Date of Patent: Feb. 20, 2024

(54) ROLLABLE ANTENNA MAT

(71) Applicant: MYLAPS B.V., Haarlem (NL)

(72) Inventor: Adriaan Klaas Verwoerd, Haarlem (NL)

(73) Assignee: MYLAPS B.V., Haarlem (NL)

( * ) Notice: Subject to any disclaimer, the term of this patent is extended or adjusted under 35 U.S.C. 154(b) by 189 days.

(21) Appl. No.: 17/293,426

(22) PCT Filed: Nov. 13, 2019

(86) PCT No.: PCT/NL2019/050740
§ 371 (c)(1),
(2) Date: May 12, 2021

(87) PCT Pub. No.: WO2020/101488
PCT Pub. Date: May 22, 2020

(65) Prior Publication Data

US 2021/0408660 A1 Dec. 30, 2021

(30) Foreign Application Priority Data

Nov. 13, 2018 (NL) ...................................... 2021987

(51) Int. Cl.
*H01Q 1/08* (2006.01)
*G07C 1/22* (2006.01)
(Continued)

(52) U.S. Cl.
CPC ............... *H01Q 1/087* (2013.01); *G07C 1/22* (2013.01); *H01Q 1/2216* (2013.01); *H01Q 9/0471* (2013.01)

(58) Field of Classification Search
CPC ........ H01Q 1/087; H01Q 1/2216; H01Q 1/38; H01Q 9/047; H01Q 9/045
See application file for complete search history.

(56) References Cited

U.S. PATENT DOCUMENTS 8,525,647 B2 * 9/2013 Varpula ................ H01Q 13/206 340/10.2
10,348,072 B2 7/2019 Gaiser et al.
(Continued)

FOREIGN PATENT DOCUMENTS

EP 3298668 B1 * 3/2019 ............... G07C 1/22
EP 3298668 B1 3/2019
(Continued)

OTHER PUBLICATIONS

International Search Report and Written Opinion for corresponding International Patent Application No. PCT/NL2019/050740 dated Dec. 17, 2019.
(Continued)

*Primary Examiner* — Seokjin Kim
(74) *Attorney, Agent, or Firm* — Steven M. Koehler; Westman, Champlin & Koehler, P.A.

(57) ABSTRACT

A rollable antenna mat for sports timing comprises one or more planar antenna structures connected to one or more transmission lines for conveying signals to and/or from the one or more planar antenna structures. Each of the one or more planar antenna structures comprises a conductive plate positioned above a conductive ground plane. A spacer element is positioned between the conductive ground plane and the conductive plate. The planar antenna structure is configured to generate a radiation field having a main axis that is substantially perpendicular to the conductive plate. The planar antenna structure and a transmission line is embedded in a flexible elongated sheet structure of one or more elastomeric materials, and comprises the embedded one or more planar antenna structures being suitable to be rolled up in a roll, the axis of the roll being substantially perpendicular to the longitudinal axis of the flexible elongated sheet structure.

19 Claims, 12 Drawing Sheets

(51) Int. Cl.
*H01Q 1/22* (2006.01)
*H01Q 9/04* (2006.01)

(56) References Cited

U.S. PATENT DOCUMENTS

| | | | | |
|---|---|---|---|---|
| 10,686,306 | B2 | 6/2020 | Gaiser et al. | |
| 2007/0004363 | A1* | 1/2007 | Kusaka | H01Q 13/206 455/559 |
| 2009/0160612 | A1* | 6/2009 | Varpula | H01Q 13/206 340/10.1 |
| 2010/0265801 | A1 | 10/2010 | Ehelen et al. | |
| 2017/0327051 | A1* | 11/2017 | Bromfield | B60R 9/065 |
| 2018/0076530 | A1 | 3/2018 | Kawahata et al. | |
| 2018/0152010 | A1* | 5/2018 | Gaiser | H02G 3/0437 |
| 2019/0296532 | A1 | 9/2019 | Gaiser et al. | |

FOREIGN PATENT DOCUMENTS

| | | | | |
|---|---|---|---|---|
| JP | 2018-046391 | A | 3/2018 | |
| WO | 2009011600 | A1 | 1/2009 | |
| WO | 2009113948 | A1 | 9/2009 | |
| WO | WO-2009113948 | A1 * | 9/2009 | G01S 13/878 |
| WO | 2016188798 | A1 | 12/2016 | |

OTHER PUBLICATIONS

Office Action in corresponding Japanese application No. 2021-525763 dated Dec. 5, 2023.

* cited by examiner

ROLLABLE ANTENNA MAT

CROSS-REFERENCE TO RELATED APPLICATION(S)

This application is a 371 National Stage Application of International Application No. PCT/NL2019/050740, filed Nov. 13, 2019 and published as WO 2020/101488 A1 on May 22, 2020, and further claims priority to Netherlands Application Ser. No. 2021987, filed Nov. 13, 2018.

FIELD OF THE INVENTION

The invention relates to a rollable antenna mat, and in particular, though not exclusively, to a rollable antenna mat for sports timing, a rollable antenna mat assembly, a stackable antenna mat assembly, an antenna mat roll, a carrier for lifting and transporting a rollable antenna mat and a sports timing system comprising a rollable antenna mat or rollable antenna mat assembly.

BACKGROUND OF THE INVENTION

Sports timing systems for sports and race events, in particular mass events such as marathons, triathlons, bicycle races, etc., should be able to reliably time hundreds of tags passing over a timing line every minute. Preferably such systems should function in harsh conditions, e.g. wet outdoor surroundings, should be relatively light and should be designed for easy and fast handling, e.g. fast installing and de-installing the sports timing system. For example, an organiser of a sports event is allowed to close roads that are part of the race track only shortly, e.g. just before the start of the actual race, in order to minimize the impact on traffic and public infrastructure. Furthermore, usually a plurality of timing lines needs to be installed along the race track, e.g. at different points of a race track. Hence, an organiser of the event usually has limited time for installing many timing lines. Therefore, these timing lines should be configured such that they can be quickly and easily installed as a plug and play system without any specialized knowledge. Additionally, regulations such as labor law regulations may require that the weight of the timing equipment should be special handling tools, e.g. carrying tools, for carrying the equipment, in particular the antenna that is used for detecting passing tags, if the weight of the equipment exceeds a certain weight, e.g. 25 kg.

US 2018/0152010 A1 discloses a timing system including a plurality of foldable mat antenna elements. Each mat element comprises an UHF antenna encapsulated in a hardcover protective casing for protecting the antenna from external influences (e.g. forces, moisture, heat, etc.). In operation, the mat is unfolded so that the mat elements are positioned side by side forming an elongated antenna mat which may be positioned over a track. Each of the mat elements may be connected to a controller which may operate the mat elements in an alternating manner in order to reduce interference between neighbouring mat elements to detecting and register UHF tags passing the mat.

The antenna mats are interlinked by means of pivot bearings which enabling folding the mat elements into a stack and unfolding the stack of mat elements into an antenna mat. Although the stackability of the mat elements allows some improvement during installing and deinstalling the mat elements, its handling is still cumbersome and the weight of the total stack can be substantial. More importantly, as the mat element is connected with one or more coax cables to a controller, folding and unfolding of the antenna mats (including the coax cables connected to the antennas), will affect the integrity of the coax cables at the position of the pivot points and ultimately the function and reliability of the mat antenna itself.

A further prior art document U.S. Pat. No. 8,525,647 describes an elongated linear leaky waveguide type antenna mat which can be positioned over a track to detect passing UHF tags. The waveguide antenna comprises a long microstrip positioned at a predetermined position over an elongated metal foil. The antenna mat can be used as a single element, which can be rolled up. The inventors acknowledge the fact that in order to preserve the carefully designed radiation pattern, the distance between the microstrip and the metal foil should remain constant, while at the same time the antenna structure needs to be sufficiently flexible so that it can be rolled up. To that end, the microstrip was embedded in a semirigid foam. It is apparent however that such antenna structure is not prone to deformation when an athlete steps onto the antenna mat. This is even more evident, in case of a marathon, e.g. the start of a marathon, wherein hundreds of athletes will pass the antenna mat in a very short time thereby exerting considerable forces onto the mat which will substantially deform the antenna structure in time thereby considerably affecting the performance and reliability of the antenna mat. Hence, it is clear that the suggested antenna is not suitable for reliably timing sporting events, in particular mass sporting events such as a marathon. More generally, the foldable or rollable antenna mat structures known from the prior art are not robust that they can withstand rolling up and unrolling the mat many times over a long period. The rolling action will affect the integrity and performance of the antenna mats.

In light of the above, there is a need in the art for a rollable antenna mat which is suitable for sports timing, in particular for sports timing of a mas sporting event. In particular, there is a need in the art for an antenna mat comprising one or more antenna elements, wherein the weight of the antenna mat is relatively light and can be rolled up and rolled out many times without affecting the performance of the antenna mat.

SUMMARY OF THE INVENTION

One aspect of this disclosure relates to a rollable antenna mat for sports timing which may comprise one or more planar antenna structures, preferably a planar antenna structure including at least one ultra-high frequency, UHF, patch antenna and/or slotted antenna, connected to one or more transmission lines, preferably UHF coaxial transmission lines, for conveying signals to and/or from the one or more planar antenna structures; each of the one or more planar antenna structures, preferably rectangular antenna structures, comprising at least one conductive plate positioned above a conductive ground plane, a spacer element positioned between the conductive ground plane and the conductive plate, the planar antenna structure being configured to generate a radiation field, the radiation field having a main axis that is substantially perpendicular to the conductive plate; and, the planar antenna structure and at least one transmission line being embedded in a flexible elongated sheet structure of one or more elastomeric materials, the flexible elongated sheet structure comprising the embedded one or more planar antenna structures being suitable to be rolled up in a roll, the axis of the roll being substantially perpendicular to the longitudinal axis of the flexible elongated sheet structure.

In an embodiment, the spacer structure may provide an out-of-plane compression stiffness to the planar antenna structures, which is higher than the out-of-plane compression stiffness of the flexible sheet structure. In another embodiment, the spacer structure may provide a bending stiffness to the planar antenna structures, which is higher than the bending stiffness of the flexible sheet structure.

The rollable antenna mat thus includes antenna structures embedded in flexible a longitudinal sheet structure. The antenna structures have a planar configuration of a radiative conductive plate positioned over a conductive ground plane, wherein a spacer element provides out-of-plane compression stiffness and a bending stiffness to the antenna structures so that in the rolled state the antenna structure may slightly bend without damage and in the unrolled state the antenna structures retain original shape. Additionally, the out-of-plane stiffness protects the antenna structures from (permanent) deformation when e.g. heavy objects, e.g. cars, trolleys or even busses move over the antenna mat during e.g. installation or just after the event. The rollable antenna structure thus provides a robust rollable structure that allows fast installation and de-installation of a timing line which does not require lifting the antenna mat or dragging the antenna mat over the ground.

In an embodiment, the length of the flexible sheet structure may be selected between 1 and 15 meter, preferably between 2 and 8 meter. In another embodiment, the width of the flexible sheet structure may be selected between 30 and 120 cm, preferably 40 and 100 cm. In another embodiment, the (maximal) thickness of the flexible sheet structure may be selected between 2 and 6 cm, preferably between 2 and 5 cm. In yet another embodiment, the dimensions the antenna structure may be selected between 5 cm and 50 cm, preferably between 14 and 20 cm, more preferably between 15 and 18 cm. In a further embodiment, the diameter of the roll may be selected between 100 and 25 cm, preferably between 80 and 28 cm, more preferably between 60 and 30 cm.

In an embodiment, the spacer element comprises a honeycomb structure, preferably the honeycomb structure including cells, the cells including at least on of: (circular-cored) hexagonal cell, (circular-cored) triangular cells, (circular-cored) square cells and/or combinations thereof. In another embodiment, the spacer element may comprise a plastic material, preferably a polyethylene, more preferably a high-density polyethylene (HDPE). Optionally, additionally or alternatively to HDPE, the spacer element comprises a material having similar material characteristics, such as a similar flexibility, as HDPE.

In an embodiment, the flexible sheet structure may comprise one or more laminated and/or bonded sheets of one or more flexible elastomeric materials, preferably the flexible sheet structure including at least a first sheet and a second sheet, wherein the one or more planar antenna structures and the one or more transmission lines are positioned between the first and second sheet.

In an embodiment, the first sheet may include a first rubber material, preferably a styrene and/or butadiene rubber material (e.g. a styrene-butadiene rubber, SBR); a butyl rubber material and/or nitrile rubber (NBR) material; and/or, the one or more flexible elastomeric materials comprising a polyurethane material; and/or, wherein the second sheet includes a second rubber material, preferably an ethylene propylene diene monomer, EPDM, rubber material. Optionally, additionally or alternatively to the EPDM rubber, the second sheet includes a material having similar material characteristics, such as a similar flexibility, as EPDM rubber.

In an embodiment, the least one of the first and second flexible sheet comprises one or more regions which have a honeycomb structure. The honeycomb structure may include a plurality of cells, the cells including at least on of: (circular-cored) hexagonal cells, (circular-cored) triangular cells, (circular-cored) square cells and/or combinations thereof.

In an embodiment, the least one of the first and second flexible sheet may comprise one or more recessed spaces in the flexible material, the one or more recessed spaces being shaped for housing the one or more planar antenna structures and the one or more one or more transmission lines.

In an embodiment, each of the one or more transmission lines may include a signal line connected to the conductive plate and a ground line connected to the conductive ground plane. In an embodiment, the signal line may be connected to an edge of the conductive plate. In an embodiment, each of the one or more transmission lines may run from a short side of the elongated flexible sheet structure along a long side of the elongate flexible sheet structure towards at least one of the one or more planar antenna structures.

In an embodiment, the signal line may be connected to the conductive plate via a microstrip formed in the conducting plate. In an embodiment, the microstrip may be formed by at least two slots in the conducting plate, wherein the slots extend from the edge of the conductive plate towards a center line of the conductive plate. In an embodiment, the antenna structure may be configured as a so-called an inset microstrip line fed patch antenna structure.

In an embodiment, each of the one or more coaxial transmission lines may comprise: an inner conductor forming a signal line, an outer conductor around the inner conductor forming a ground line and a dielectric between the inner and outer conductor; the inner conductor being connected to the conductive plate and the outer conductor being connected to the conductive ground plane.

In an embodiment, an end part of the coaxial transmission line may be oriented parallel to an edge of the antenna structure, the edge of the antenna structure being parallel to the roll axis of the roll, preferably an end part of the coaxial transmission line comprising an end part of the inner conductor.

In an embodiment, at the connection point between the inner conductor and the conductive plate, the inner conductor may be oriented parallel to the roll axis of the antenna mat.

In an embodiment, the antenna mat may include one or more test device, preferably one or more (passive) UHF transponders, being positioned at fixed position relative to at least one of the one or more planar antenna structures. In an embodiment, a test device may be configured to receive a test signal from at least one of the one or more planar antenna structures and/or to transmit a test signal to at least one of the one or more planar antenna structures.

In an embodiment, a flexible conductive sheet may be provided below the one or more planar antenna structures for reducing signal dissipation into the ground when the antenna mat is positioned across the race track, preferably the flexible conductive sheet being in electrical contact with the ground plane of the patch antenna.

In a further aspect, the invention may relate to a rollable antenna mat assembly comprising: a rollable antenna mat according to one or more of the preceding claims; and, a cylindrically shaped roll element, the roll element having a curved surface the antenna mat can be wound around the roll element, preferably the antenna mat being (at least partially) wound around the roll element and/or the roll element comprising edges for enabling stacking of the rollable antenna mat assembly on top of another rollable antenna mat assembly.

In an embodiment, the rollable antenna mat may be mechanically and electrically connectable to the roll element. In an embodiment, the roll element may include UHF connectors which are electrically connected to the one or more transmission lines of the rollable antenna mat. In another embodiment, the roll element may comprise an antenna controller connected to the one or more transmission lines of the rollable antenna mat.

In an embodiment, the assembly may further comprise: a carrier structure for transporting and lifting an antenna mat roll, preferably the carrier structure including a rectangular tray, the tray including edges positioned along the sides of the tray wherein the edges are configured to stop the antenna mat from sliding of the tray during transportation; more preferably a first frame structure being connected to the tray positioned along a first side of the tray and a second frame structure connected to the tray positioned along a second side of the tray, opposite to the first side of the tray.

In yet another embodiment, the invention may relate to a carrier structure for lifting, carrying and/or transporting a rollable antenna mat as described above in a rolled-up state according. In an embodiment, the carrier structure may comprise wheels. In another embodiment, the carrier structure is stackable.

The antenna mat may be understood to have a length extending in a longitudinal direction and a width extending in a traverse direction and the antenna mat may be understood to be suitable to be rolled up and unrolled along its length. In such case, the roll axis of the antenna may be understood to be parallel to the traverse direction. Typically, if the antenna mat is in a rolled-out state, the length of the antenna mat extends across the race track, i.e. extends along the longitudinal axis of the antenna mat, in particular of the flexible elongated sheet, and the width of the antenna mat is substantially parallel to the direction of participants on the race track. In one example, when the antenna mat is rolled up into a cylindrically shaped roll it may take the form of a hollow cylinder having two annular bases. The axis of a cylinder may be understood to be the line joining the respective centers of the bases of a cylinder or, in case the roll forms a hollow cylinder, the line joining the centers respectively defined by the annular bases.

The antenna mat may be flexible such that the antenna mat can be wrapped around the curved surface of a cylinder having a circular base, the circular base having a diameter of 1 meter, preferably 0.5 meter, more preferably 0.35 meter, without damaging the antenna mat or any of its components.

In general, the bending rigidity of a material may be expressed by its minimum bend radius, which is the minimum radius a sheet, pipe, tube, cable, hose or mat can be bent without kinking it and/or damaging it and/or shortening its life and/or permanently deforming it. The smaller the minimum bend radius of a material, the greater its flexibility and the lower its bending rigidity. The flexible sheet may have a first bending rigidity, and the spacer structure may have a second bending rigidity, wherein the second bending rigidity is higher than the first bending rigidity. The minimum bend radius of the flexible material can be measured by bending the flexible sheet (without any components), and observing at which bend radius the sheet permanently deforms and/or is damaged. The minimum bend radius of the spacer structure can be measured by bending the spacer structure, and observing at which bend radius the sheet permanently deforms and/or is damaged.

The device passing the antenna mat typically is a transponder carried by an athlete or mounted in or on a vehicle, such as a car or bicycle. Such transponder may be an active or passive transponder. An active transponder comprises its own power source for transmitting signals, whereas a passive transponder uses energy that was obtained through the reception of another signals to transmit a signal. The transponder may be configured to, in response to a signal received from one of the plurality of patch antennas, transmit a response signal back to the antenna mat, in particular to one of the patch antennas of the antenna mat. A signal received from the device passing the antenna mat, such as the above-described response signal may comprise an identifier of the device. Hence, a timing system that is connected to the antenna mat will be able to determine a passing time of the particular device.

The predetermined distance between the ground plane and patch may be constant for one patch antenna and may be the same for all patch antennas.

The plurality of antennas may be positioned within, on and/or underneath the antenna mat. In one example, a plurality of patch antennas is glued onto the flexible material, wherein the flexible material is continuous along the full length of the antenna mat. The antenna mat being in rolled-up state may be understood as the antenna mat being wound around a curved surface, e.g. around a tube, and/or as the timing may having been turned over and over on itself without folding. Unrolling the antenna mat may be understood as opening out the antenna mat from the rolled-up state substantially without toppling or tumbling.

In one embodiment, the elongated sheet comprises at least a first elongated first sheet of first flexible material positioned over at least a second elongated second sheet of a second flexible material, wherein the at least one patch antenna is positioned between the first and second sheet. This embodiment allows to make use of different material characteristics of the different sheets. To illustrate, the sheet of the antenna mat that is facing the ground when installed across a race track is preferably very rough in order to prevent any sliding of the mat over the ground when it is installed across the track.

In one embodiment, the first flexible material comprises, e.g. essentially consists of, rubber, such as styrene-butadiene rubber. Preferably, the rubber is pressure molded such that it also comprises cavities for receiving a coaxial transmission line and test devices that are described below. Advantageously, rubber can serve as a flexible and/or bendable and very durable layer in which the patch antenna(s) and other elements of the antenna mat may be embedded.

In one embodiment, the second flexible material comprises, e.g. essentially consists of, rubber, such as ethylene propylene diene monomer (EPDM) rubber, wherein preferably the second flexible sheet is continuous along substantially the entire length of the timing mat. EPDM rubber advantageously is rough and durable.

The connection between the coaxial cable and the patch antenna may be a relatively weak point in the antenna mat. The orientation of the connector pin parallel to the roll axis advantageously prevents high mechanical stresses on the pin, which could damage the connection. If the connector pin would be oriented for example perpendicular to the roll axis, for example in the longitudinal direction of the antenna mat, then rolling up the antenna mat would, at least to a higher extent, cause the connector pin to bend. Such a bend may damage the connection between the pin and patch antenna.

Such honeycomb structure may reduce the weight of the antenna mat, yet without significantly weaken the antenna mat. A honeycomb structure is namely a lightweight structure that can withstand relatively high deforming forces.

In one embodiment, the mat comprises a plurality of patch antennas connected, each of the plurality of patch antennas being connected a coaxial cable for conveying signals to and/or from the at least one patch antenna. Each patch antenna comprises a conductive patch positioned above a conductive ground plane, a spacer element positioned between the conductive ground plane and the conductive patch, the dimensions of the patch antenna being associated with ultra-high frequency UHF signals. Each patch antenna and at least part of the one or more coaxial cables are embedded in a flexible elongated sheet that can be rolled up, preferably that can be rolled up into a cylindrically shaped roll, the axis of the cylindrically shaped roll being substantially perpendicular to the longitudinal axis of the flexible elongated sheet.

In one embodiment, the plurality of patch antennas comprises a plurality of pairs of patch antennas. In this embodiment, each pair comprises two patch antennas that are positioned behind each other as viewed in a longitudinal direction of the antenna mat. Further, the distance between the pairs is larger than the distance between two antennas forming such pair.

It should be understood that the antennas forming a pair may be neighboring antennas. The plurality of pairs may be distributed across the longitudinal direction of the antenna mat.

A method for operating the antenna mat may comprise controlling a pair of antennas to simultaneously transmit during a first time period and to refrain from transmitting during a second time period so that the pair of antennas can receive signals from the device passing the antenna mat during the second time period. Especially if the antennas forming the pair are positioned close to each other, it is important that the first and second time period for both antennas are synchronized. If one antenna of the pair would transmit a signal while the other antenna of the pair would “listen” to signals, the other antenna would receive the signal transmitted by the one antenna, which would distort measurements. By connecting each antenna pair to one electrical cable that conveys signals to and from the antenna pair, the above described synchronization can be easily secured.

Preferably, the distance between two patch antennas forming a pair is comparable to an average width of an athlete’s shoe. This distance between two antennas forming a pair may be selected between 5 and 15 cm, preferably between 8 and 12 cm. Such a distance between a pair is associated with a small probability that a pressure exerted by one shoe touching the antenna mat simultaneously detune both of the antennas forming the pair. For this to happen, an athlete must namely step precisely in between the two antennas. Furthermore, such a distance is also associated with a small probability that two shoes belonging to two different athletes simultaneously and respectively detune both antennas. For this to happen, two athletes must namely run very close next to each other, which is unlikely.

Preferably, an antenna mat comprising a plurality of patch antennas as disclosed herein is formed as a single unit, meaning that such antenna mat is not formed by releasably connected antenna modules, wherein each module has one and only one antenna.

In one embodiment, each of the plurality of patch antennas is connected to a respective coaxial cable, or each of the plurality of patch antennas is connected to a bus system for conveying signals to and/or from the patch antennas. Such configuration allow for efficiently conveying signals between patch antennas and a controller for example.

The antenna mat according to one or more of the preceding claims, the antenna mat comprising at least one test device having a fixed position relative to at least one to be tested patch antenna, the test device being configured to receive a test signal from and/or to transmit a test signal to said at least one to be tested antenna.

In one embodiment, the antenna mat comprises at least one test device having a fixed position relative to at least one to be tested patch antenna. The test device is configured to receive a test signal from and/or to transmit a test signal to said at least one to be tested antenna. Preferably, the antenna mat comprises a test device for each antenna of the plurality of antennas or for each antenna pair.

This embodiment enables to assess the performance of the to be tested patch antenna. Since the test device has a fixed position relative to the to be tested antenna, the signal strength of a test signal as received by either one of the test device or antenna does not vary in dependence of the distance between the test device and to be tested patch antenna and does not vary in dependence of the relative positions of the test device and to be tested patch antenna with respect to each other. Therefore, if the strength of the test signal as transmitted is predetermined and the same for every test, in principle, the signal strength as received should also have the same value. If the received signal strength is varies among performed tests, that could be an indication that either the antenna is not properly receiving and/or transmitting the test signal and/may thus not function properly. In an example, the test device is a passive transponder. In this example, the to be tested antenna would transmit a signal having a predetermined strength to the test device. Then the test device would, upon reception of this signal, transmit the test signal back to the antenna, which would in turn measure the signal strength of the test signal as received.

In one embodiment, a flexible conductive sheet is provided below each patch antenna for reducing signal dissipation into the ground when the antenna mat is positioned across the race track, the flexible conductive sheet being in electrical contact with the ground plane of the patch antenna. This flexible sheet prevents signal dissipation as well as shields the patch antenna from external radiation.

One aspect of this disclosure relates to a system comprising an antenna mat as described herein and a cylindrically shaped element, such as a tube, the element having a curved surface such that the element is rollable and such that the antenna mat can be wound around the cylindrically shaped element.

In one embodiment of this system, the cylindrically shaped element comprises a controller for controlling the patch antenna or the plurality of patch antennas, wherein a coaxial transmission line is provided between the one or more patch antennas and controller for conveying signals between the one or more patch antennas and the controller.

One aspect of this disclosure relates to a carrier structure for carrying the antenna mat in a rolled-up state. The carrier structure comprises wheels and preferably the carrier structure being stackable. This carrier structure enables to easily transport the antenna mat.

One aspect of this disclosure relates to an antenna mat, such as a sports timing mat. The antenna mat comprises flexible material such that the antenna mat is suitable for being rolled up and unrolled across a race track. Further, the antenna mat comprises a patch antenna for receiving from and/or transmitting to a device that is passing the antenna mat a signal. The patch antenna comprises a conductive ground plane and a conductive patch that are separated a predetermined distance apart. The antenna mat also comprises a rigid structure at the patch antenna, the rigid structure being configured to inhibit change of the predetermined distance due to pressure exerted on the antenna mat while the antenna mat is in a rolled-out state. It is easily understood that the features described in this disclosure can be implemented in this antenna mat. To illustrate, this antenna mat can be in an at least partially rolled-up state and/or the patch antenna(s) can be embedded in flexible material, such as rubber, e.g. in the sense that the patch antenna(s) are embedded in a flexible sheet described herein and/or the patch antennas may be similar to the patch antennas described herein and/or the patch antennas may be positioned in the mat as described herein and/or the patch antennas may form pairs of antennas as described herein and/or the antenna mat may comprise at least one test device as described herein and/or the antenna mat may be dimensioned as described herein and/or the patch antenna(s) may be configured to transmit and/or receive UHF signals, et cetera.

Due to the rigid structure, the distance between the ground plane and the patch remains constant even if the flexible material surrounding the antenna deforms. Such deformation may be a permanent deformation caused by the repeated rolling up and unrolling of the antenna mat and/or a temporary deformation that may be caused by a person stepping on the antenna mat. The ability of the antenna mat to function properly even if the flexible material is deformed, is beneficial because the distance between ground plane and patch is an important design parameter that greatly influences the functioning of the antenna. Any change of this distance may cause the antenna to function improperly. Thus, the antenna mat disclosed herein is robust in the sense that its functioning will not be severely impacted by persons stepping on the antenna mat and/or by the repeated rolling up and unrolling of the antenna mat.

The rigid structure does not need to extend throughout the entire length of the antenna mat, because the enhancement of the antenna mat's rigidity is only required at the patch antenna, thus only required locally. A (temporary) deformation of the flexible antenna mat at a position away from a patch antenna namely does not necessarily distort timing measurements, because such a deformation does not necessarily cause a change of the distance between the patch and the conductive ground plane. As a result of the rigid structures not extending throughout the entire length of the antenna mat, the antenna mat as a whole can still be rolled up and unrolled.

The flexible material may have a first rigidity and the rigid structure may have a second rigidity, wherein the second rigidity is higher than the first rigidity. The flexible material may have a first rigidity and the rigid structure may have a second rigidity, wherein the second rigidity is higher than the first rigidity.

In one embodiment, the antenna mat comprising the rigid structure comprises a plurality of patch antennas for receiving a signal from and/or transmitting to a device that is passing the antenna mat a signal. Each patch antenna comprises a conductive ground plane and a conductive patch that are separated a predetermined distance apart. The antenna mat comprises a rigid structure at each patch antenna. At each patch antenna, the rigid structure is configured to inhibit change of said predetermined distance due to pressure exerted on the antenna mat. This embodiment further eases installation, because it enables to position several antennas with the single action of rolling out the antenna mat.

The flexible material may be connector material that physically connects the plurality of patch antennas. The connector material may have a rigidity that is lower than the rigidity of the rigid structure. Preferably, the connector material connecting two antennas is continuous, which may be understood as that the connector material between these two antennas forms an unbroken whole without additional connector elements such as hinges. The connector material between all neighbouring antennas may be continuous. This enables to make the antenna mat even more robust, because no connector elements are required. In one embodiment, the rigid structure at the or each patch antenna is a spacer structure for separating the conductive ground plane and the conductive patch the predetermined distance apart, for example a spacer element mentioned above.

In one embodiment, the rigid structure is a rigid structure at least partially surrounding the assembly of ground plane and conductive patch, which structure is configured to prevent, or at least reduce, forces being exerted on the ground plane and/or the conductive patch due to pressure exerted on the antenna mat. The structure may be understood to shield the patch antenna from external forces.

One distinct aspect of this disclosure relates to an antenna mat, e.g. a sports timing mat, comprising an antenna for receiving a signal from and/or transmitting a signal to a device that is passing the antenna mat, wherein the timing system comprises at least one test device having a fixed position relative to at least one antenna that is to be tested, the at least one test device being configured to receive a test signal from and/or to transmit a test signal to said at least one to be tested antenna. Optionally both the test device and the antenna may be embedded in said mat.

Another aspect of this disclosure relates to a method for assessing a performance of an antenna, e.g. a patch antenna, of a timing system. The timing system comprises a test device having a fixed position relative to the antenna. Further, the test device is configured to transmit a test signal to the antenna and/or to receive a test signal from the antenna. The method comprises steps i-iv. Step i comprises causing the antenna to transmit the test signal to the test device. Causing the antenna to transmit a signal may comprise controlling the antenna to transmit the signal, for example by feeding the signal to the antenna through a coaxial transmission line. Step ii comprises receiving from the test device the test signal as received by the test device. Step iii comprise comparing the test signal as received by the test device with a reference signal. Step iv comprises, based on this comparison, determining that the antenna malfunctions. Additionally or alternatively to steps i-iv, the method comprises steps v-viii. Step v comprises causing the test device to transmit the test signal to the antenna. Causing the test device to transmit the test signal to the antenna may comprise controlling the antenna to transmit a signal to the test device upon which the test device transmits a test signal back to the antenna. In such case, the test signal may be a backscatter signal. Note that the test device may be a passive transponder tag. Step vi comprises receiving from the antenna, the test signal as received by the antenna. Step vii comprises comparing the test signal as received by the antenna with a reference signal. Step viii comprises based on this comparison, determining that the antenna malfunctions.

In response to determining that the antenna malfunctions, the method may comprise outputting an indication that the antenna malfunctions, such as displaying an alert on a computer screen.

The reference signal may be a test signal as received that was measured when steps i and ii, or steps v and vi, were performed shortly after fabrication of the timing system, e.g. during a calibration procedure.

Preferably, each antenna of sub group of antennas of the timing system has an associated test device positioned at a fixed position relative to the antenna or sub group of antennas. This allows the method for assessing the performance to be executed separately and reliably for each antenna. The antenna may have a fixed position in a protective casing and/or in protective material and the test device may have a fixed position in this protective casing and/or in this protective material.

In an example, the test signal as received and the reference signal may be compared in the sense that a value for the strength of the test signal as received is compared with a reference signal strength value. If the test signal strength then deviates more than a certain threshold from this reference value, the method comprises determining that the antenna malfunctions.

With this method, the performance of a patch antenna of the antenna mat as described above can be assessed. Then, the test device may be embedded in the connector material, just as the patch antennas.

The above described method may be a computer-implemented method in which case the test can be automatically performed. For example, with a single user instruction, the test method may be performed subsequently for each of the plurality of patch antennas. Optionally, each patch antenna has its own test device. Alternatively, two or more patch antennas share a single test device. Thus, in an example, a user can with one interaction with a computer, e.g. with the controller as described herein, verify that all patch antennas in the antenna mat are working properly.

One aspect of this disclosure relates to a computer program or suite of computer programs, that, when executed, causes a data processing system to perform the above described method or any other method described in this disclosure that can be executed by a data processing system.

One aspect of this disclosure relates to a computer comprising a computer readable storage medium having computer readable program code embodied therewith, and a processor, preferably a microprocessor, coupled to the computer readable storage medium, wherein responsive to executing the computer readable program code, the processor is configured to perform one or more steps of the methods described herein.

The invention will be further illustrated with reference to the attached drawings, which schematically will show embodiments according to the invention. It will be understood that the invention is not in any way restricted to these specific embodiments.

DETAILED DESCRIPTION

Figure 1:
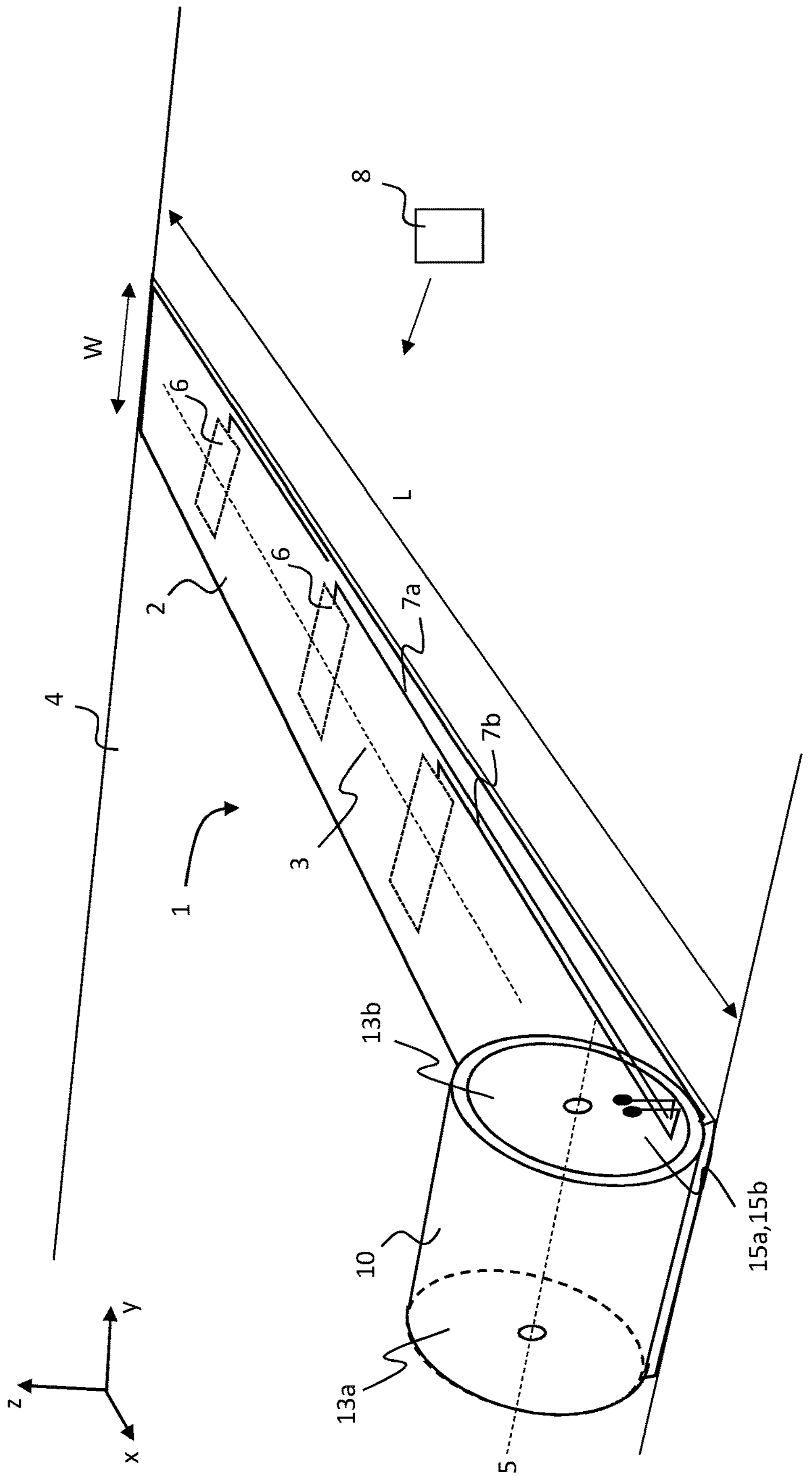
FIG. 1 illustrates an antenna mat according to an embodiment.

FIG. 1 illustrates a rollable antenna mat assembly 1 according to an embodiment of the invention. The antenna mat assembly may include an antenna mat structure 2 (or in short the antenna mat) and a cylindrical roll 10. The antenna mat may include an elongated flexible sheet structure which can be rolled-up and unrolled across a race track 4. Examples of a race track may include a running course, e.g. for a marathon or an obstacle race, a speed skating ice ring, a circuit for car racing, a circuit for motor racing, etc. In this example, the antenna mat 2, when unrolled across the track 4 may have a length L and a width W. The length of the antenna mat may be selected such that it extends across substantially the entire width of the race track 4. The length L of the antenna mat, when unrolled may be between 1 and 15 meter, preferably between 2 and 8 meter. In an embodiment, the length L may be approximately 6 meters. Similarly, the width W may be between 20 and 70 cm.

In an embodiment, flexible sheet structure may comprise one or more (laminated and/or bonded) sheets of a flexible material that has a large abrasion resistance, tear strength, chemical resistance, temperature compatibility and aging. In an embodiment, flexible material may include a rubber material, for example a (synthetic) rubber elastomeric material based on styrene and/or butadiene, e.g. a styrene-butadiene rubber (SBR) material. Alternatively, one or more other elastomeric materials may be used including but not limited to butyl rubber and/or nitrile rubber (NBR). Alternatively and/or in addition, the flexible sheet structure may comprise one or more sheets of an elastomeric polyurethane material. Preferably, at least part of the sheets may be fabricated and structured using a moulding technique.

In an embodiment, the (rigid) cylindrical roll 10 or tube may be used to roll the antenna mat into a rolled-up state. As shown in the figure, the roll axis 5 of the roll (the x-direction in FIG. 1) may be substantially perpendicular to the longitudinal axis 3 of the sheet (the x-direction in FIG. 1). The antenna mat wound around the roll may form an antenna mat roll. The thickness of flexible sheet structure and the used elastomeric materials may be selected such that the antenna mat can be wound around a roll 10 having a diameter selected between 100 and 25 cm, preferably between 80 and 28 cm, more preferably between 60 and 30 cm.

The antenna mat 2 may comprise one or more planar ultra-high frequency UHF antenna structures. In an embodiment, the one or more UHF antenna structures may be implemented as patch and/or slotted antenna structures. A planar UHF antenna structure may comprise at least one conductive plate, e.g. a patch, positioned above a conductive ground plane, wherein a (dielectric) spacer element is positioned between the conductive ground plane and the conductive plate. The planar UFH antenna structure may be configured to generate a radiation field, wherein the radiation field has a main axis that is substantially perpendicular to the conductive plate.

Each of the planar antenna structures may be connected to a coaxial transmission line 7*a*,7*b*, such as a low-loss UHF coax cable, for providing an UHF connection between a planar antenna structure and an antenna controller. At least part of the transmission lines may be embedded in the elongated flexible sheet structure of the antenna mat. In an embodiment, one end of the antenna mat may be mechanically connectable to the roll. In one example, the antenna mat is affixed to the roll by means of one or more screws. In that case, in an embodiment, the antenna structures embedded in the antenna mat may also be electrically connectable to UHF transmission lines in the roll. In an embodiment, at least one side (a base) of the (hollow) roll may include a wall comprising UHF connectors 15*a*,15*b* wherein each of the UHF connectors is connected via at least one transmission line to one of the antenna structures.

In an embodiment, the antenna mat may be part of an RFID system, wherein an antenna controller controls the antennas to generate a radiation field at a certain frequency, wherein the (main) axis of the radiation field points in an upward direction away from the antenna mat (e.g. in the positive z-direction perpendicular to the plane of the mat). If a transponder, e.g. an active or passive UHF tag, moves into the radiation field, the transponder 8 may be triggered to transmit one or more signals back to the antenna mat, which may be detected by one of the patch antennas. The transponder 8 may be worn by an athlete, for example on a shoe or bib worn by a participant of the sports event. Alternatively, the transponder 8 may be attached to a vehicle of a participant of a sports event, such as a race car, motorcycle or a flying drone. The transponder signal may include a unique identifier associated with the transponder which can be linked with a participant.

In an embodiment, the RFID system may be a sport timing system for determining a passing time of the transponder 8. In for example, the antenna mat may be used as a detection antenna of a sports timing system as e.g. described in WO2015/140271A1, which is hereby incorporated by reference into this application. Typically, the transponder is configured to transmit one or more signals comprising an identifier ID to the antenna mat, which will detect and analyse the transponder signals so that the passing time of the transponder can be detected.

As shown in the figure, the rollable antenna mat allows very fast and efficient installation and setup of a timing line. An organizer of a race event merely needs to position an antenna mat roll at one side of the race track 4 and to unroll the mat in order to position the antenna. In the unrolled state, the antennas and the wiring are embedded in and protected by the elongated flexible sheet structure and thus optimally positioned in the mat. In case the roll includes the electrical connectors, the UHF connectors, the mat can be directly connected to an antenna controller.

Figures 2A, 2B, 2C:
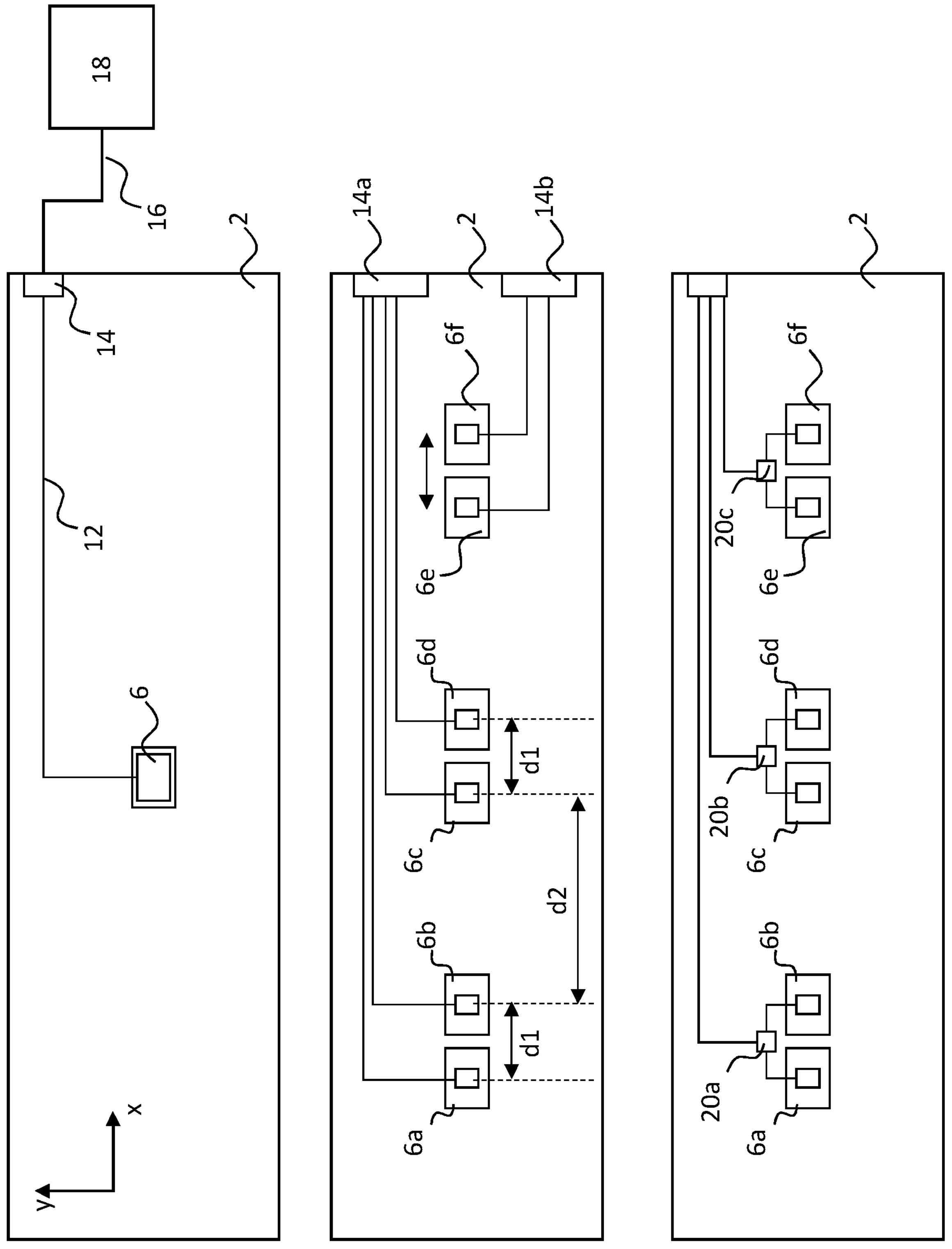
FIG. 2A-2E illustrate an antenna mat according to various embodiment of the invention.

Different arrangements of planar antenna structures may be possible. FIG. 2A-2E illustrate top views of antenna mat structures according to various embodiment of the invention. FIG. 2A schematically shows an embodiment of an antenna mat 2 comprising a single planar UHF antenna structure 6. The antenna structure may be connected to an UHF transmission line 12, e.g. an UHF coaxial transmission line, which may be at least partially embedded in the flexible sheet structure. The coaxial transmission line 12 may be configured to convey signals between the patch antenna 6 and an antenna controller 18. The antenna controller 18 may be configured to control the planar antenna structures embedded in the antenna mat. Such controllers are well known in the art and typically include receiver circuitry for enabling at least part of the antenna structures in the antenna mat to receive a signal from a transponder and transmission circuitry for enabling at least part of the antenna structures in the antenna mat to transmit a modulated carrier signal. The controller may further include a processor configured to process received signals and/or to prepare signals to be transmitted by the patch antenna. Processing such signals typically involves at least one of (de)modulating signals, applying filters to signals, such as low-pass and high-pass filters.

As shown in FIG. 2A, a coaxial transmission line 12 embedded in a flexible elongated sheet structure may electrically connect at least one planar antenna structure to at least one UHF connector structure 14 located one of the short edges of the elongated sheet structure. UHF connector structure 14 may be used to connect the embedded planar antenna structures via a further coax line 16 to external electronics such as the antenna controller. In an embodiment, the UHF connector structure may be integrated in the side of the short edge of the a flexible elongated sheet structure.

FIG. 2B schematically shows an embodiment of an antenna mat comprising a plurality of planar UHF antenna structures 6*a*-6*f*. In an embodiment, the planar UHF antenna structures may be arranged in pairs, e.g. first pair antennas 6*a* and 6*b*, second pair antennas 6*b* and 6*c*, third pair antennas 6*e* and 6*f*, etc. Each pair may comprise two planar UHF antenna structures 6*a*-6*f* that are positioned relatively close to each other. Preferably, a distance d2 between pairs of UHF antenna structures is larger than the distance d1 between two antennas forming such pair.

In one embodiment, the controller 18 may be configured to control the plurality of antennas. In a first time period the controller may control a first subset of one or more antennas out of the plurality of antennas to transmit signals for triggering UHF tags passing the antenna mat to transmit tag signals back to the antenna mat. Then, in a subsequent second time period the controller may control a second subset of one or more antennas out of the plurality of antennas to transmit signals for triggering UHF tags passing the antenna mat, wherein first subset and second subset include different antennas. In an embodiment, when a first subset of antennas is in a transmitting mode, the second subset of antennas may be in a signal receiving mode in which the antennas are configured to receive UHF tag signal. Likewise, when the second subset is in the transmitting mode, the first set is in the signal receiving mode.

In one embodiment, a first antenna and second antenna of an antenna pair may belong to different antenna subsets, e.g. one in the first subset so that this one antenna transmits during the first time period and the two neighbouring antennas on either side in the second subset so that these neighbouring antennas transmit during the second time period.

In yet another embodiment, the plurality of antennas may comprise more than two subsets, such as three subsets of antennas. In this case, the first subset may transmit during a first time period, the second during a second time period, the third during a third time period, et cetera. These time periods preferably follow directly after each other. In one example, the plurality of antennas consists of as many subsets as antenna, each subset comprising one and only one antenna. Then, during a first time period, a first antenna may be in transmitting mode, during the second time period a second antenna may be in transmitting mode, during the third time period a third antenna may be in transmitting mode, et cetera. These time periods may follow directly after each other.

In one embodiment, a pair of patch antennas belongs to the same subset. In this embodiment, preferably, pairs of antennas belong to a different subset, so that two neighbouring pairs do not transmit simultaneously. In case the plurality of antennas comprises more than two subsets, the plurality of antennas may comprise as many subsets as there are antenna pairs in the antenna mat, wherein each subset comprises one and only one antenna pair. Then, a first pair may be in transmitting mode during a first time period, a second pair during a second time period, a third pair during a third time period, et cetera. Again these time periods may follow directly after each other.

The above described transmission schemes advantageously reduce cross-talk between the antennas, which can distort measurements. Cross-talk may be understood to occur when an antenna sitting in a signal receiving mode receives a signal directly, e.g. without the signal being backscattered from a device that is passing the timing mat, from another antenna that is transmitting a signal. The above-described time periods in which an antenna transmits a signal typically last 3 ms.

FIG. 2C schematically an embodiment of an antenna mat, wherein a splitter device 20 for splitting UHF signals is positioned near each antenna pair. Such splitter may be used to reduce the amount of coaxial transmission lines that needs to be embedded in the antenna mat.

Figure 2D:
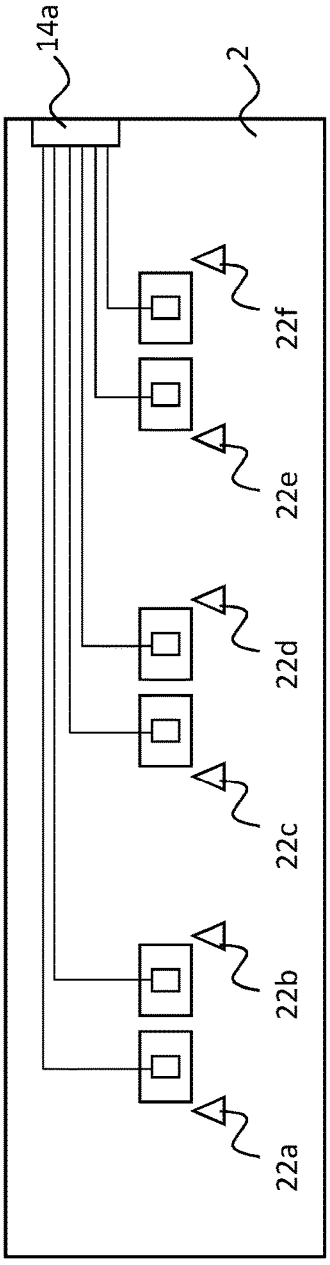

FIG. 2D schematically shows an embodiment of an antenna mat comprising at least one test device 22 having a fixed position relative to at least one to be tested patch antenna. The test device 22 may be configured to receive a test signal from an antenna and/or to transmit a test signal to an antenna that needs to be tested. The test signals may be used to assess the performance a planar UHF antenna structure that is embedded in rollable antenna mat structures as described with references to the embodiments described in this application. In an embodiment, the test device may be a transponder, e.g. an active or passive transponder.

A test protocol may be executed by the antenna controller, wherein the test protocol may include controlling a planer UHF antenna structure to transmit an antenna test signal of a predetermined amplitude and phase. In response, the antenna test signal may trigger the test device, e.g. a (passive or active) transponder, to measure one or more signal strengths of the test signal transmitted by the antenna structure and to transmit a transponder test signal back to the antenna structure, wherein the transponder test signal may include the one or more measured signal strengths. The test may include comparing the transponder test signal, in particular the one or more signal strengths, with a reference signal. Based on the comparison, the controller may determine whether the antenna structure functions according to the specifications or not. The test protocol may be performed for each antenna structure in the antenna mat.

Figure 2E:
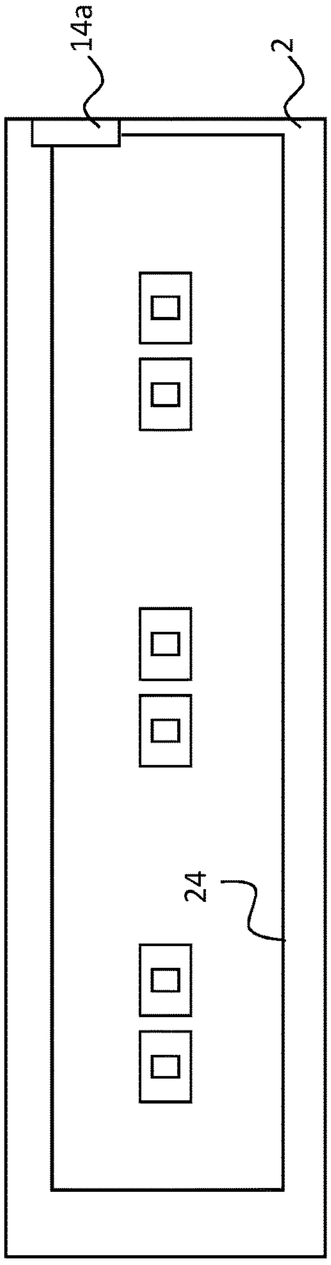

FIG. 2E schematically shows an embodiment of an antenna mat which may comprise, in addition to one or more planar antenna structures 6, at least one loop antenna 24. The loop antenna may form a coil for generating a magnetic field. The loop antenna may be used to generate a magnetic field which may inductively couple with a magnetic coil of a transponder moving over the antenna mat. Such inductively coupled transponders may be used to determine very accurate passing times. Such sports timing system are e.g. described in WO2016/097215, which is hereby incorporated by reference. For clarity reasons, the transmission lines for connecting the planar antenna structures 6 is not shown.

Figure 3:
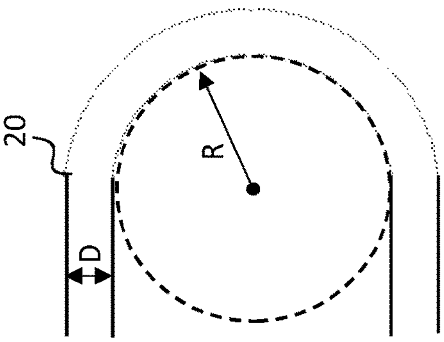
FIG. 3 illustrates a bend radius of a sheet of material.

The antenna mat structures described with reference to FIGS. 1 and 2 are configured to be wound around a roll of a predetermined diameter. Typically, the roll may have a diameter selected between 100 and 25 cm, preferably between 80 and 28 cm, more preferably between 60 and 30 cm. FIG. 3 illustrates a bend radius R of a flexible sheet of material 20 having a thickness D. The bend radius R is the radius of curvature that the inner surface of the sheet makes. The minimum bend radius is the smallest radius R for which the sheet of material 20 does not damage and/or does not permanently deform. The smaller the minimum bend radius of a material, the higher its flexibility and the lower its bending rigidity.

The materials and the dimensions (especially the thickness) of the elongated flexible sheet structure of the antenna mat may be selected to have a relative low bending rigidity, whereas the materials and dimensions (especially the thickness) of the planar antenna structures may be selected to form a structure of a bending rigidity that is higher than the bending rigidity of the flexible sheet structure. Thus, the bending rigidity of the flexible sheet structure and the planar antenna structure may be expressed in terms of the flexural or bend modus of the materials that are used for the flexible sheet structure and the antenna structure respectively. The flexural or bend modus may be determined based on a standardized measurement protocol, e.g. ASTM D790 and ISO 178 test methods.

Figure 4A:
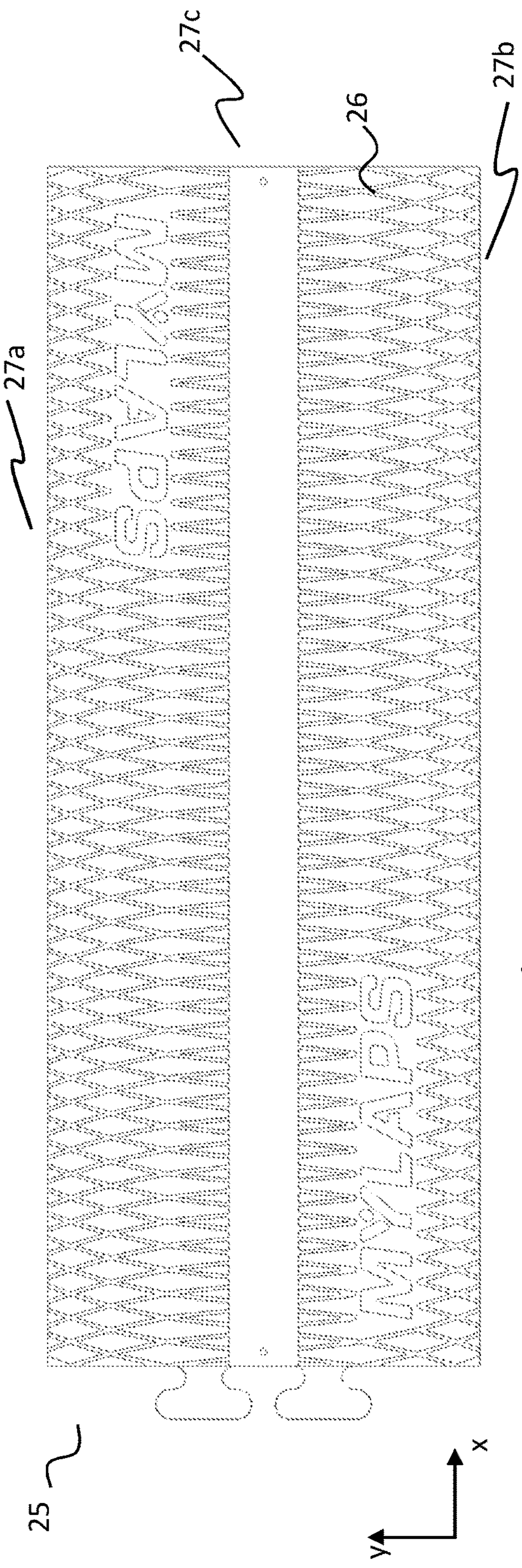
FIG. 4A-4B depict structured elastomeric sheets for an antenna mat according to an embodiment of the invention.
Figure 4B:
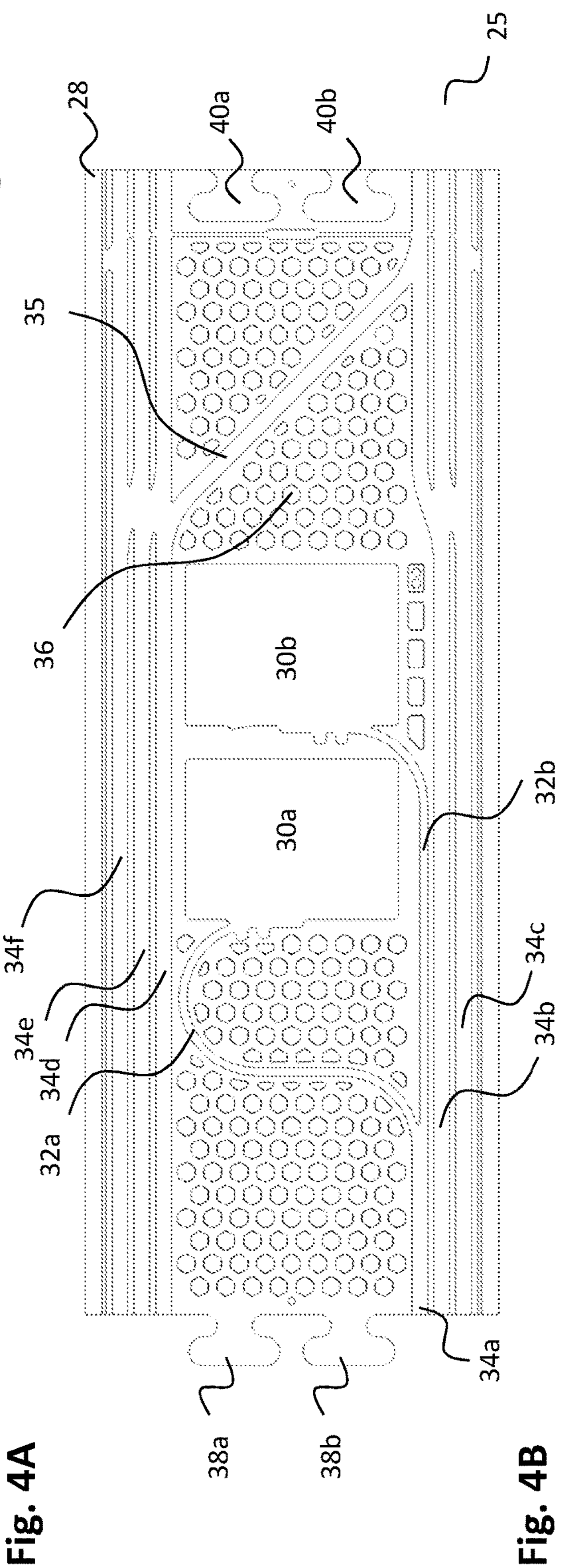

FIGS. 4A and 4B depict an elongated flexible sheet structure of an antenna mat according to an embodiment of the invention. FIG. 4A shows a first top surface of an elongated flexible sheet element 25 that may function as flexible cover sheet. The elongated flexible sheet element may include one or more sheets of one or more flexible materials e.g. one or more rubber materials, for example a (synthetic) rubber elastomeric material based on styrene and/or butadiene, e.g. a styrene-butadiene rubber (SBR) material, a butyl rubber and/or nitrile rubber (NBR) material or an elastomeric polyurethane material. As shown in FIG. 4A the top surface may include anti-slip grooves 26, so that participants are less likely to slip and fall when stepping onto the antenna mat. Furthermore, the thickness of the peripheral parts 27*a*,27*b* parallel to the longitudinal sides of the sheet may be relatively thin when compared with the thickness of the central part 27*c* of the flexible sheet element. The thickness of the peripheral parts 27*a*, 27*b* may be in the range 2-5 mm, preferably approximately 3 mm. The thickness of the central part may be in the range 8-13 mm, preferably 11 mm.

FIG. 4B depicts a back view of the flexible sheet element. This figure shows that the back surface of the elongated flexible sheet element 25 is structured so that the planar antenna structures and the coaxial transmission lines can be embedded in the sheet element. In one embodiment, sheet element may comprise one or more recessed spaces 30*a*,30*b*, e.g. cavities, which are shaped in the form of the planar antenna structures. Furthermore, in an embodiment, flexible sheet element may comprise one or more elongated recessed spaces, e.g. channels and/or grooves, for embedding coaxial transmission lines. In an embodiment, the elongated recessed spaces for the coaxial transmission lines may be located in the peripheral parts 27*a*,27*b* of the longitudinal sides of the flexible sheet element. The recessed spaces may accurately follow the shape of the planar antenna structures and the transmission lines so that the planar antenna structures are accurately positioned within the antenna mat. Accurate positioning of UHF elements like the antenna structures and the coaxial transmission line it is important as mechanical loads on the UHF elements may locally changes the UHF impedance of elements, which may cause degradation of the performance of the mat antenna.

To illustrate, in the embodiment of FIG. 4B a coaxial transmission line that is to be connected to e.g. a patch antenna in cavity 30*a* may be positioned in channel 32*a* and coaxial transmission line that is to be connected to the patch antenna in cavity 30*b* can be positioned in channel 32*b*. Channels 32*a* and 32*b* merge into side channel 34*a* in which two transmission line can be positioned. A side channel may be understood to be a channel extending along the length of the antenna mat that is preferably positioned near a longitudinal side of the antenna mat. Furthermore, the antenna mat comprises side channels 34*b*,34*c*,34*d*, 34*e*, 34*f*. Each side channel can receive at least one coaxial transmission line, preferably at least two coaxial transmission lines, for electrically connecting patch antennas to a controller that is external to the antenna mat. In this example, the two cables respectively connected to the two antennas of an antenna pair are positioned together in the same side channel. The side channels 34 may guide the coaxial transmission lines to the side of the antenna mat, e.g. to one or more openings in the antenna mat at which one or more coaxial transmission lines can enter/exit the antenna mat.

The antenna mat, in particular the flexible material, may comprise at least one region 36 comprising honeycomb structures. Such an area is advantageous because it reduces the weight of the antenna mat without significantly weakening the mechanical strength of the antenna mat 2. In an embodiment, the honeycomb structure may include cells. The shape of the cells may include at least one of: (circular-cored) hexagonal cell, (circular-cored) triangular cells, (circular-cored) triangular cells, (circular-cored) square cells and/or combinations thereof.

The flexible sheet element may further comprise one or more protrusions 38*a* at a first short side of the sheet element and one or more recessed spaces at the second short side (opposite the first short side) wherein the one or more recessed spaces are shaped to receive protrusions of a further sheet element. Hence, the flexible sheet element may be used to form an long flexible sheet by mechanically connecting elements using the protrusions and corresponding recessed spaces at the short sides of the sheet elements. This way, during manufacture of an antenna mat, multiple sheet elements may be used to form a long flexible top sheet of an antenna mat. After positioning the one or more protrusions 38 of one antenna mat into the one or more cavities 40 of another antenna mat. Such modular approach allows easy and flexible manufacturing of rollable antenna mats of different lengths.

In a further embodiment, flexible sheet element may further comprise a channel 35 for receiving a coaxial transmission line, wherein the channel may guide a coaxial transmission line from a first longitudinal side of the antenna mat to the second longitudinal side of the antenna mat. Such channel 35 allows rerouting of coaxial transmission lines from a side channel on one long side of the antenna mat to a side channel 34*d* on the other long side of the antenna mat 2. These one or more coaxial transmission lines are then connected to patch antennas that are positioned in another antenna mat (not shown). In an embodiment, flexible sheet elements as depicted in FIGS. 4A and 4B may be fabricated and structured using a moulding technique.

Figure 5:
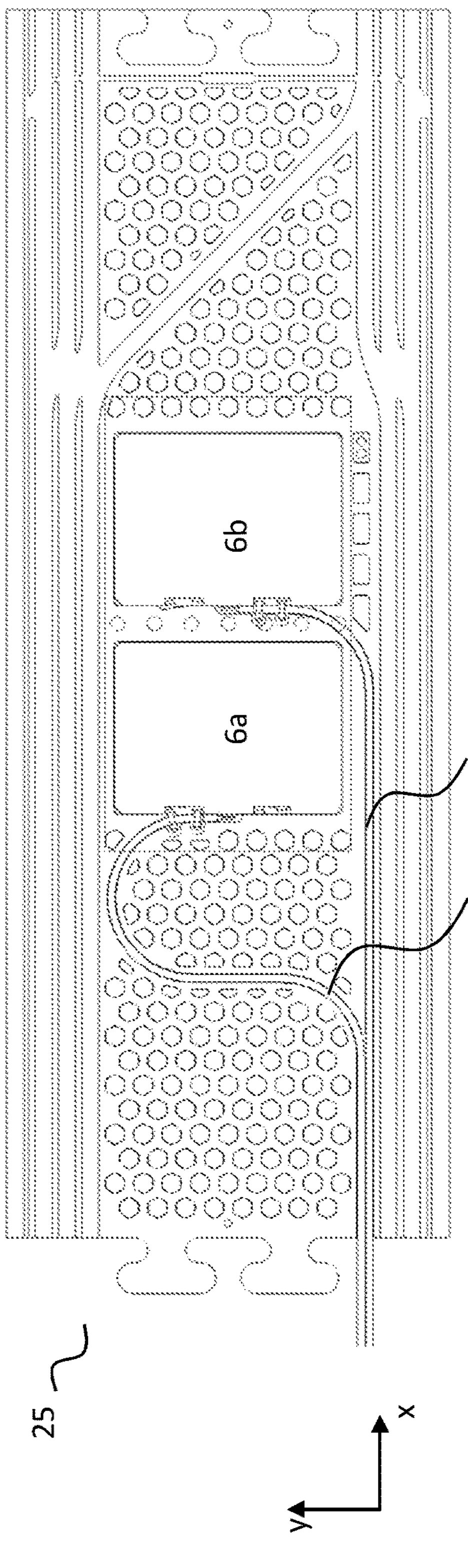
FIG. 5 depicts a top view of part of an antenna mat according to an embodiment of the invention.
Figure 6:
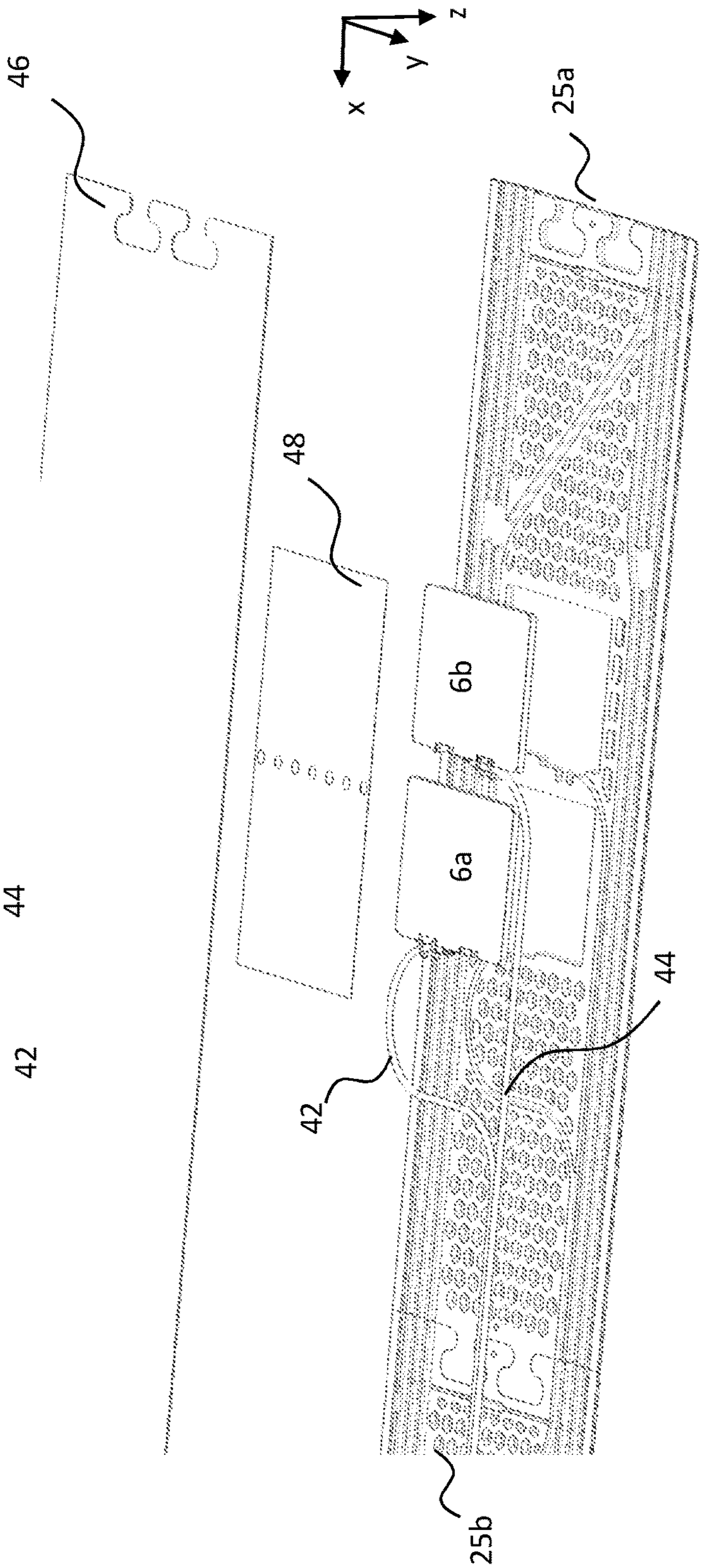
FIG. 6 depicts a three-dimensional view of part of an antenna mat according to an embodiment of the invention.

FIGS. 5 and 6 depict part of an antenna mat assembly according to an embodiment of the invention. FIG. 5 shows a back view of a flexible sheet element as described with reference to FIGS. 4A and 4B. Planar antenna structures 6*a*,6*b*, in this example two patch antennas, a first patch antenna and a second patch antenna, are positioned in cavity 30*a* and cavity 30*b* respectively. Furthermore, a first coaxial transmission line 42 connected to the first patch antenna 6*a* is positioned in channel 32*a* and a second coaxial transmission line 44 connected to the second patch antenna 6*a* is positioned in channel 32*b*. As shown in FIG. 5, the substantially rectangular patch antenna may be positioned such that two sides of the antenna structure are substantially parallel to the longitudinal axis of the antenna mat (the outer sides of the antenna structure) and two sides of the antenna structure are substantially perpendicular to the longitudinal axis of the antenna mat (the inner sides of the antenna structure).

FIG. 6 schematically illustrates part of an antenna mat assembly (in this case a 3D back view). The assembly may include a flexible sheet element 25, planar antenna structures 6*a*,6*b*, coaxial transmission lines 42,44, antenna shielding layer 48 and a flexible cover sheet 46. The figure shows the antenna mat assembly upside down in the sense that the shown surface of cover layer 46 is positioned on the ground of the race track and faces the ground when the antenna mat 2 is unrolled across the race track. In one embodiment, cover layer 46 may comprise, (or essentially consists of), an elastomeric rubber, e.g. ethylene propylene diene monomer (EPDM) rubber. Preferably, an elastomeric rubber is selected that is durable and rough and which prevents the antenna mat 2 to slip or slide over the surface of the race track. Cover layer 46 is provided over the flexible sheet element comprising the planar antenna structures and the coaxial transmission lines and bonded to the surface of the flexible sheet element 25 in order to form a flexible sheet structure in which the planar antenna structures are embedded. Hence, the cover layer and the flexible sheet element may hermetically seal and protect the UHF elements from external (mechanical, thermal and/or electrical) influences.

A method for manufacturing the antenna mat may comprise moulding, e.g. low-pressure moulding, a flexible material into a structured flexible sheet element including recessed structures for planar antenna structures and coaxial transmission lines connected to the planar antenna structures, positioning the planar antenna structures and coaxial transmission lines into the recessed structures and sealing the antenna mat structure using the cover layer 46 (which may also be referred to as bottom layer). As such, the cover layer and the structured flexible sheet elements form a layered flexible sheet structure in which a plurality of planar antenna structures are embedded wherein a layered flexible sheet structure forms an antenna mat which can be rolled up.

In one embodiment, the antenna mat may comprise a conductive layer 48, e.g. a metal foil or a metallized film, which will be explained in more detail with reference to FIG. 7. Furthermore, FIG. 6 shows that a plurality of flexible sheet elements 25*a*, 25*b* may be physically connected to each other so as to form a flexible antenna mat of a desired length. In this embodiment, the flexible sheet elements connected by means of the protrusions 38 and cavities 40 described above.

It is submitted that structure of the antenna mat is not limited to the figures. For example, in further embodiments, instead of and/or in addition to the use of a flexible structured top sheet, the bottom layer may also include structures, e.g. recessed spaces and/or honeycomb structures, for embedding the antenna structures in the antenna mat and/or for providing a light flexible structure that has advantageous mechanical properties, e.g. in terms of (out of plane) compression stiffness and/or bending stiffness.

Figure 7A:
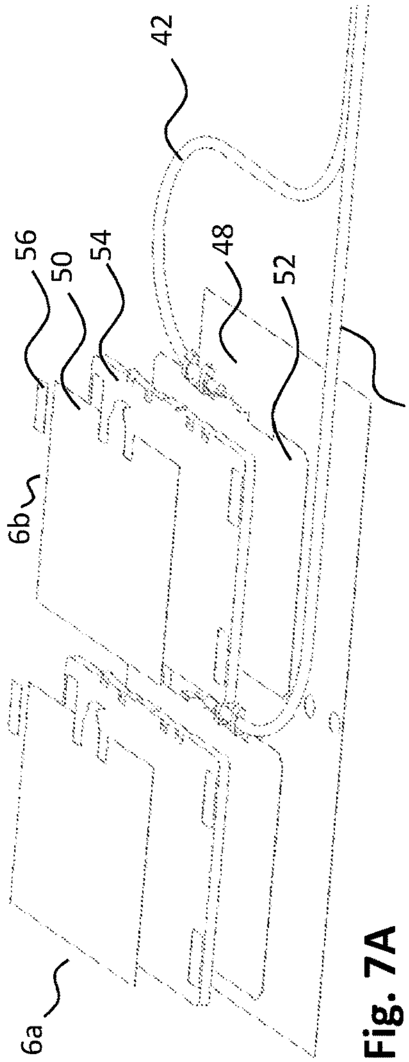
FIGS. 7A-7C depict a three-dimensional view of a planar antenna structure according to an embodiment of the invention.
Figure 7B:
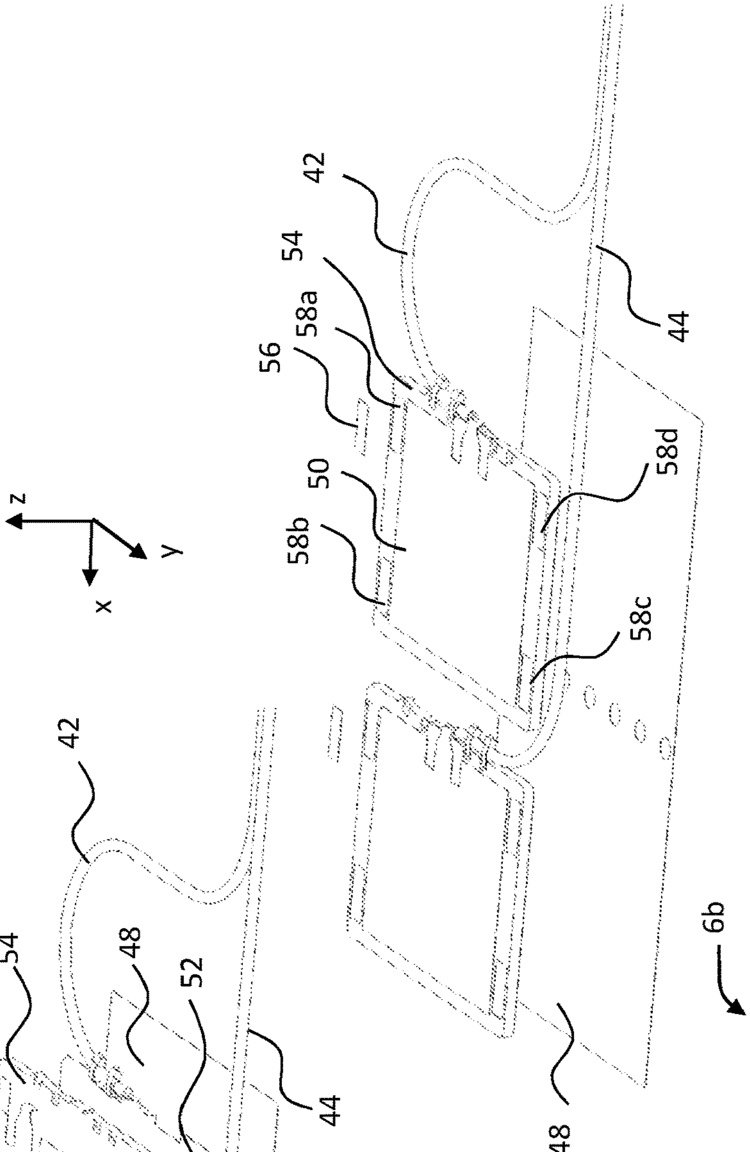
Figure 7C:
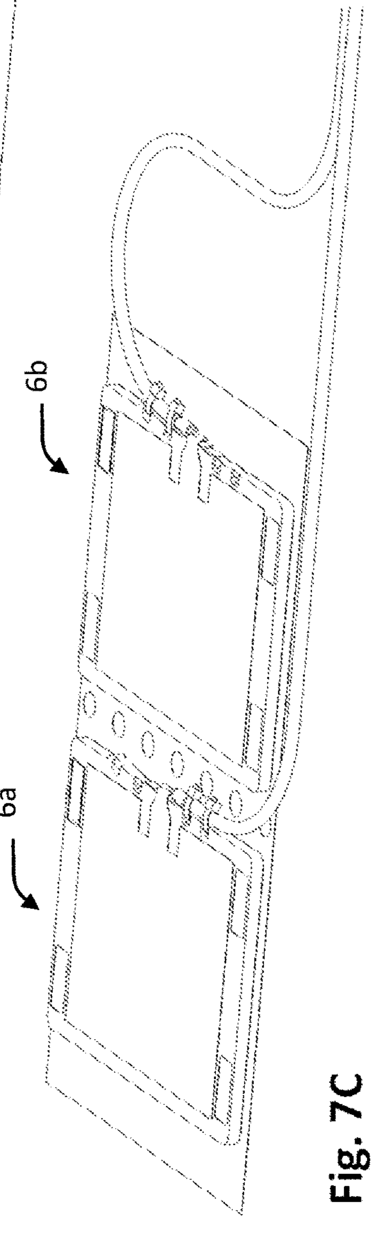

FIGS. 7A-7C and 8 depict a more detailed view of planar antenna structures according to various embodiment of the invention. As will be described hereunder in more detail, the antenna structures are configured such that they are particular robust against mechanical loads, in particular bending forces, due to the unwinding and the winding of an antenna mat roll. FIGS. 7A and 7B show exploded views of a planar antenna structure according to an embodiment. In this embodiment, the antenna structure may include one or more planar UHF antenna structure 6*a*,6*b*. FIG. 7C shows the antenna structure in its assembled state. These figures show the antenna from a top view in the sense that ground plate 52 is positioned closer to the race track than conductive patch 50 when the antenna mat is unrolled across the race track, i.e. when the antenna mat is in its operating position.

The planar UHF antenna structure may comprise at least one conductive plate 50 positioned above a conductive ground plane 52 and a spacer element 54 positioned between the conductive ground plane and the conductive plate. The planar UFH antenna structure is configured to generate a radiation field, wherein the radiation field may have a main axis that is substantially perpendicular to the conductive plate. Thus, at least a large part of the radiation field will be generated directly above the antenna structure in a direction perpendicular to the plane of the conductive plate. In an embodiment, the antenna structure includes a patch antenna, wherein the radiative element is conductive patch over a ground plane as e.g. depicted in FIG. 7, wherein the dimensions of the patch determine the radiative properties, e.g. the radiation frequency, of the antenna. In another embodiment, the antenna structure may include a slotted antenna. In such configuration the radiative element is (at least) one slot in a metal plate. In that case, the dimensions of the slot will determine the radiative properties, such as the radiation frequency of the antenna. The main shape of the conductive plate of the antenna may be rectangular. Other antenna configurations that depicted in the figures are also possible. For example, in an embodiment, an array of planar antenna structures, e.g. an array of patch and/or slotted antennas may be used. In another embodiment, a so-called planar inverted-F antenna (PIFA) may be used as a suitable planar antenna structure.

In addition, in an embodiment, a conductive shielding layer may be positioned under the antenna structures. The shielding layer which is electrically separated from the ground plane and the metal plate will shield the antenna structures from dielectrical and/or electromagnetical effects originating from objects and/or sources underneath the antenna mat. Further, the shielding layer will direct the radiation generation by the antenna structure in a direction normal to the shielding layer away from the ground.

The shielding layer may be connected to the ground plane 52 and is positioned substantially parallel to ground plane 52. The dimensions of the conductive foil 48 may larger than the dimensions of conductive ground plane 52 so that the conductive foil 48 can provide additional shielding for the patch antenna from external radiation and/or so that signals emitted by the patch antenna are directed upwards. The latter prevents that energy is wasted by transmitting electromagnetic radiation into the ground.

The shielding layer and the antenna plates, i.e. the conductive plate and the ground plate, may be made from any suitable conductive material, preferably a copper or another suitable metal.

As shown in the figures a coaxial transmission line is guided along the longitudinal axis of the antenna mat towards an antenna structure. When the transmission line approaches the antenna structure, the coaxial transmission line is guided in a direction that is substantially perpendicular to the longitudinal axis of the antenna mat and substantially parallel to an inner edge of the antenna structure. As will be described hereunder in more detail, the signal line of the coaxial transmission line is connected to a side of the conductive plate such that the mechanical load on the UHF connection due to the winding up and unwinding of the antenna mat roll is minimal.

The spacer structure 54 provides a stable separation between the ground plane and the conductive plate of the antenna. It is designed to inhibit changes to the separation due to pressure exerted on the antenna mat. In one embodiment, the spacer structure may comprise (or essentially consists of) a plastic, such as high-density polyethylene (HDPE).

One or more test devices 56*a*-56*b*, e.g. a passive tag, that, may be positioned in a fixed position with respect to an antenna structure 6*a*,6*b*. A test device 56 may be mounted on the spacer structure 54 or in a space in the spacer structure, e.g. pockets 58*a*, 58*b*, 58*c*, 58*d*. This way, the test device is positioned at a peripheral area of the antenna structure close to the radiation plate of the antenna.

Figure 8:
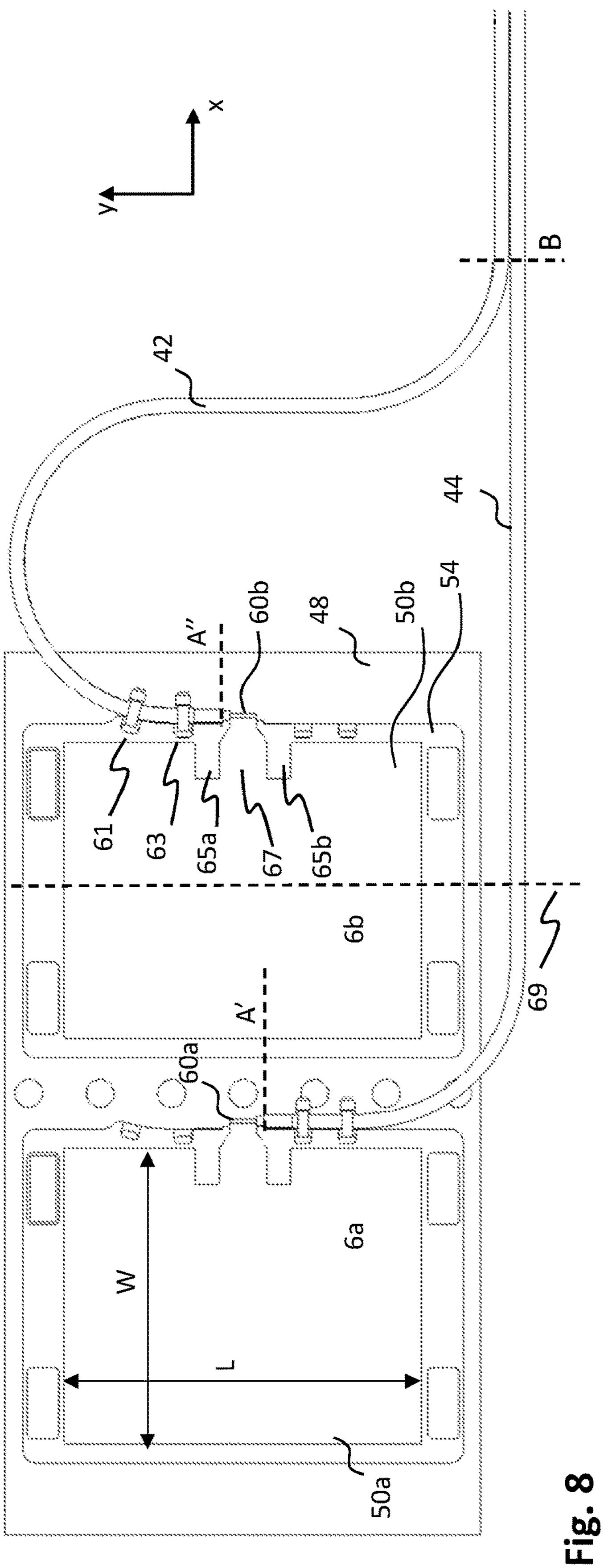
FIG. 8 shows a top view of a planar antenna structure according to an embodiment of the invention.

FIG. 8 shows a top view of a planar antenna structure according to an embodiment of the invention. In this particular embodiment, each planar antenna structure 6*a*,6*b* may the antenna structure comprises a substantially rectangular plate 50*a*,50*b*. In one embodiment, dimensions of the plate may be selected so that the antenna radiates at a frequency in the Ultra High Frequency (UHF) range. The UHF range may include RF signals having a carrier frequency between 300 and 3000 MHz. In one embodiment, the planar antenna structures may be configured to transmit signals having a carrier frequency between 850 and 950 MHz. A dimension of the antenna structure, such as the width indicated by W, may approximately equals a half or a quarter wavelength associated with the carrier frequency of the antenna. Dimensions of the conductive plate (or in case of a slotted antenna) dimensions of a slot in a conductive plate (of a length L and width W) may be selected between 5 cm and 50 cm, preferably between 14 and 20 cm, more preferably between 15 and 18 cm.

As shown in FIG. 8 the conductive plate may be coupled to the coaxial transmission line via a microstrip 67. In an embodiment, at least part of the microstrip 67 may be formed by two slots 65*a*,65*b* which extend from an edge of the conductive plate 50*b* towards a center line 69 of the conductive plate. Such antenna structure may be referred to as a so-called inset microstrip line fed patch antenna. The thus formed inset feed may be used to match the impedances. For example, a (⅛)-wavelength inset would decrease the input impedance by 50% compared to a standard microstrip transmission line feed. Other types of feeds may also be used including but not limited to a quarter-wavelength transmission line feed, a probe feed, and/or an aperture feeds.

In one embodiment, the coaxial transmission lines may be configured as coax cables using a SubMiniature version A (SMA) type connector for connection e.g. the antenna controller. The inner conductor 60*a*, 60*b*, of the coaxial transmission line is connected to the conductive plate of the antenna structure. As depicted in the figure, at the connection point 60*a*,60*b* between the conductive plate and the transmission line 44,42, the longitudinal axis of the end of the transmission line (i.e. points A' and A" in FIG. 8) may be oriented substantially parallel to the axis of the antenna mat roll (i.e. parallel to the y-axis as shown in FIG. 8). This is achieved by one or more edge connectors 61,63 for mechanically connecting part of the end of the coaxial transmission line to an edge of the antenna structure close to the connection point at which the conductive plate of the antenna structure is connected to the coaxial transmission line. In an embodiment, the one or more edge connectors may be an integral part of the ground plate 54 as depicted in the figures. In that case, in an embodiment, the one or more edge connectors may also provide an electrical connection between the outer conductor (the ground) of the coaxial transmission line and the ground plate of the antenna structure. The one or more edge connectors enable the axis of the end of the coaxial transmission line to be parallel to the edge of the connection point 60*a*,60*b*. At the connection point, conductor plate 50*a*,50*b* may include a connector part which engages with the inner conductor of the coaxial transmission lines so that a mechanical and electrical stable UHF can be established between the conductor plate and the coaxial transmission line. Because the connection part is oriented parallel to the roll axis (which is parallel to the x-axis in FIG. 8) mechanical stress and wear on the UHF connection due to winding and unwinding the mat multiple times can be substantially reduced.

In an embodiment, antenna structures 6*a* and 6*b* may be a pair of patch antennas that is to be controlled to simultaneously emit signals (e.g. as described with reference to FIG. 2B). In that case, the coaxial transmission line 42 between an external controller and antenna structure 6*b* should have the same length as coaxial transmission line 44 between the external controller and antenna structure 6*a* in order to prevent that the two patch antennas emit signals asynchronously, e.g. to prevent that one of the patch antennas is emitting a signal whilst the other patch antenna is "listening" to signals. Such crosstalk due to signal skew may significantly distort measurements. Therefore, in one embodiment, the coaxial transmission lines connecting a pair of antenna structures to an antenna controller of equal length. Thus, the length of transmission line 44 at connection point 60*a* (point A') and point B is equal to the length of transmission line 42 at connection point 60*b* (point A") and point B, i.e. the position where both transmission lines meet. Preferably, the two transmission line follow the same trajectory from point B to a controller.

Figure 9:
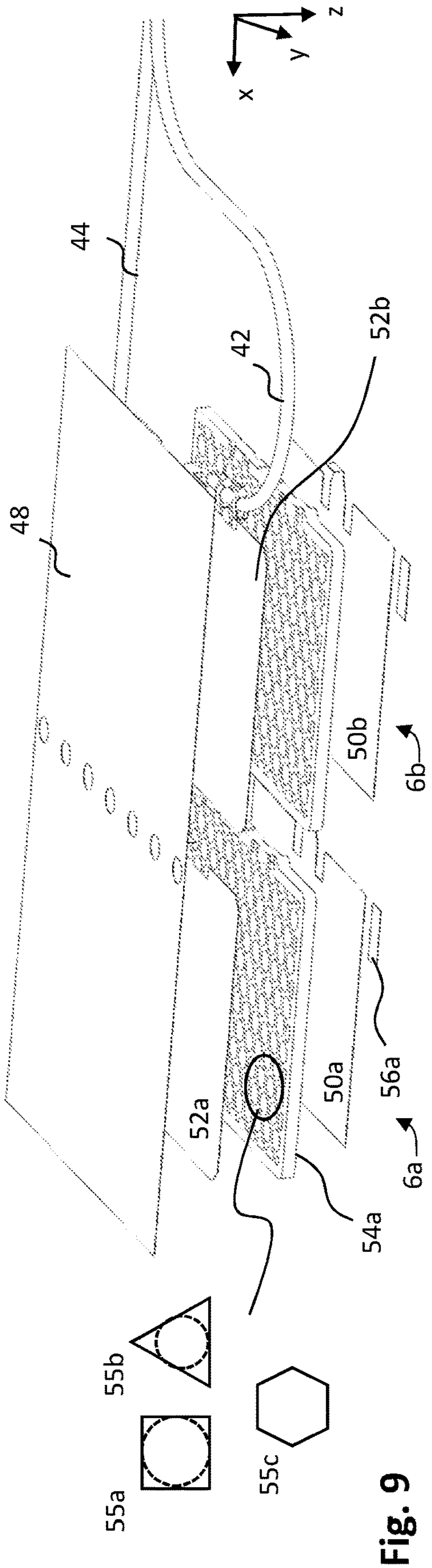
FIG. 9 depicts a three-dimensional view of a planar antenna structure according to an embodiment of the invention.

FIG. 9 shows of a planar antenna structure according to an embodiment of the invention. As shown in this figure, each planar antenna structure 6*a*,6*b* may include a spacer element 54*a*,54*b* for providing a spacing between a ground plane 52*a*,52*b* and a conductive plate 50*a*,50*b*. In an embodiment, the thickness of the spacer element (defining the spacing) may be selected between 3 and 9 mm. In this embodiment, the spacer structure 54*a*,54*b* may be structured on the basis of a honeycomb structure. In an embodiment, the honeycomb structure may include cells 55*a*-55*c*, wherein the geometry of the cells may include at least on of: hexagonal cell, triangular cells, triangular cells, square cells and/or combinations thereof. A cell size of a cell described herein may be understood to be the diameter of the largest circle that can be inscribed inside the cell with the circle touching one or more cell walls. In one embodiment, the cell sizes are in the range between 1 and 15 mm, preferably between 1 and 10 mm, more preferably between 1 and 8 mm. The honeycomb structure may be formed by a plurality of repeating units having a width and/or length in the range between 5 and 10 mm and preferably a height equal to the thickness of the spacer element. Each repeating unit may comprise one and only one cell. In some embodiments, these cells may include an additional circular structure. These cells may be referred to as circular-cored hexagonal, triangular or square-type cells. The conductive plate (the patch) and the conductive ground plane may be bonded to the honeycomb spacer element thereby forming a composite structure of excellent strength to weight ratio. The antenna structure is both light and possess an excellent resistance against bending loads when winding and unwinding the antenna mat roll. In one embodiment, the total weight of the antenna mat may be below 25 kilograms, preferably below 23 kilograms.

Figure 10A:
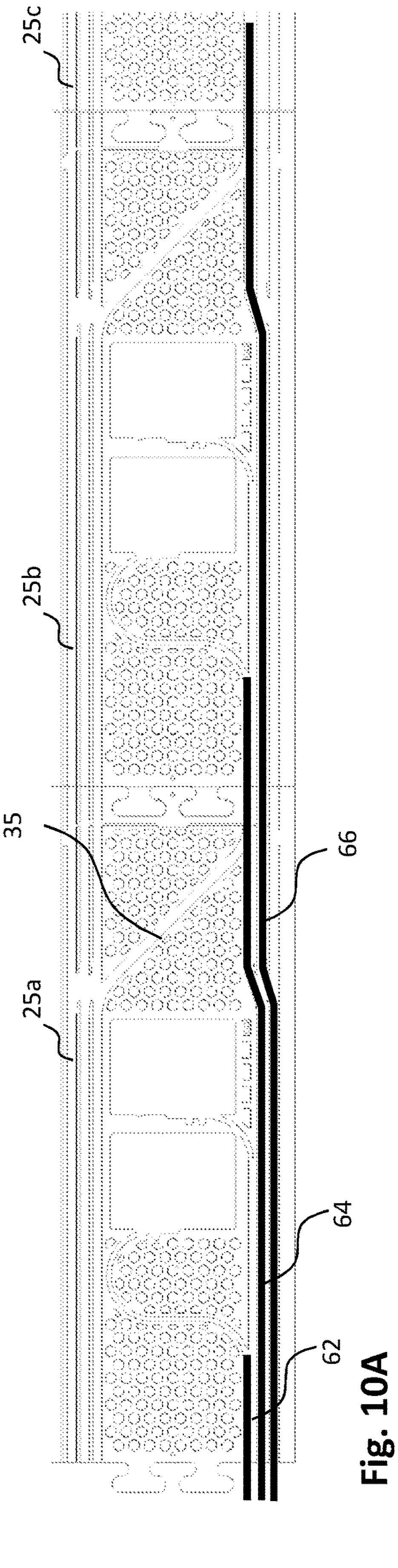
FIG. 10A-10B depict a rollable antenna mat for sports timing according to an embodiment of the invention.
Figure 10B:
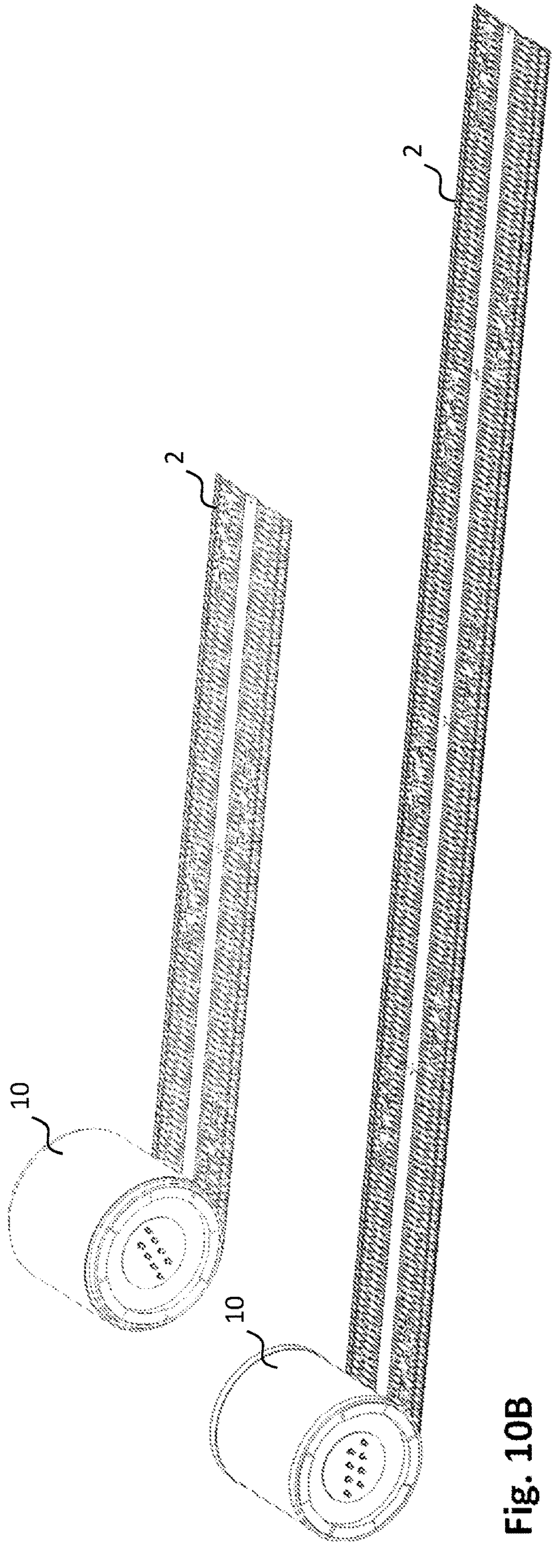

FIG. 10A depicts a rollable timing mat comprises a plurality of flexible structured sheet elements, e.g. at least three flexible sheet elements 25*a*, 25*b* and 25*c* as described with reference to FIGS. 4A and 4B. FIG. 10A further shows a plurality of side channels 62, 64, 66 along the edges of the longitudinal side of the flexible sheet elements. Each side channel may contain at least one coaxial transmission line for an antenna structure, e.g. an antenna pair, of a flexible sheet element. For example, side channel 62 may be configured to guide one or more coaxial transmission lines for the antenna structure of flexible sheet element 25*a*, trajectory 64 for the antenna structure of flexible sheet element 25*b* and trajectory 25*c* for the antenna structure of flexible sheet element 2*c*. One or more cross channels 35 in the flexible sheet elements may be used to reroute coaxial transmission lines from one side of the antenna mat to the other side of the mat. This way, a long antenna mat may be formed. FIG. 10B illustrates a timing mat assembly including an antenna mat 2 that is mechanically and electrically connectable to a roll structure 10 (e.g. a reel). In the figure, timing mat 2 is at least partially wound around the cylinder body 10, e.g. an aluminium or plastic body. Additionally, FIG. 10B shows (bottom) the timing mat 2 in an unrolled state. FIG. 10B illustrates the ease with which the timing mat can be installed across a race track. A user simply has to position the cylinder body 10 around which the timing mat is wound, at one side of a race track. Then, installation merely involves rolling the cylinder body such that the timing mat unrolls and is positioned on the race track. This does not involve any dragging of parts of the timing mat over the ground.

Figure 11:
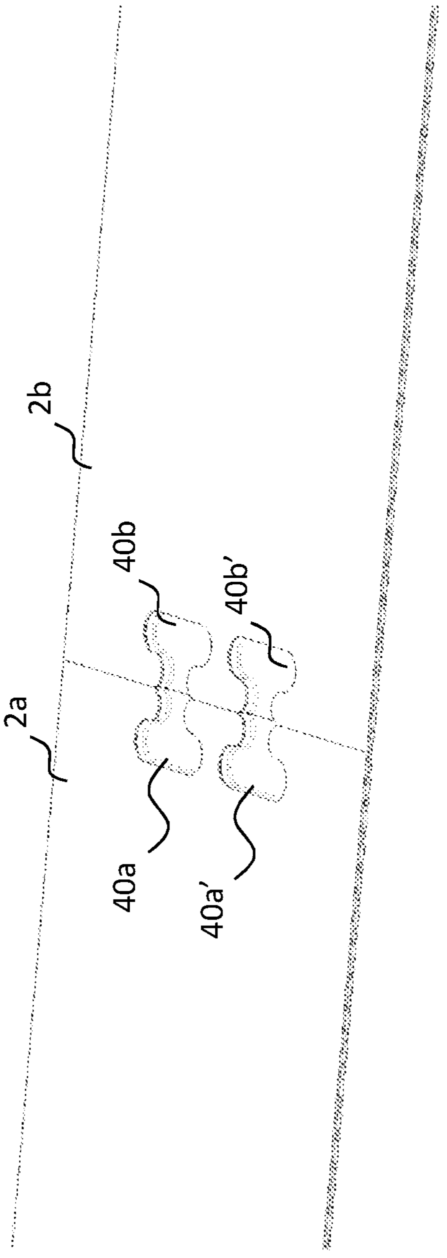
FIG. 11 depicts connection means for connecting two antenna mat modules into a rollable antenna mat according to an embodiment of the invention.

FIG. 11 shows an embodiment wherein at least two timing mats 2*a* and 2*b* as e.g. depicted in FIG. 4B are positioned against each other. For clarity, only the cavities 40 are shown. The cavity 40*a* of timing mat 2*a* and the cavity 40*b* of timing mat 2*b* together form a further cavity. Optionally, as in this example, the cavity 40*a*' of timing mat 2*a* and cavity 40*b*' of timing mat 2 also form a further cavity. The two timing mats may be connected to each other by placing a connector in the cavity as formed by the two cavities 40*a* and 40*b*. If applicable, a second connecter can be placed in the cavity that is formed by cavities 40*a*' and 40*b*'. As such, even further timing mats can be produced, for example more than six timing mats can be connected to each other even if each sub-timing mat only comprises a total of six side channels. In an example, the connector is thus shaped as a dog bone. Further, the connector may be EPDM or SBR rubber.

Figure 12A:
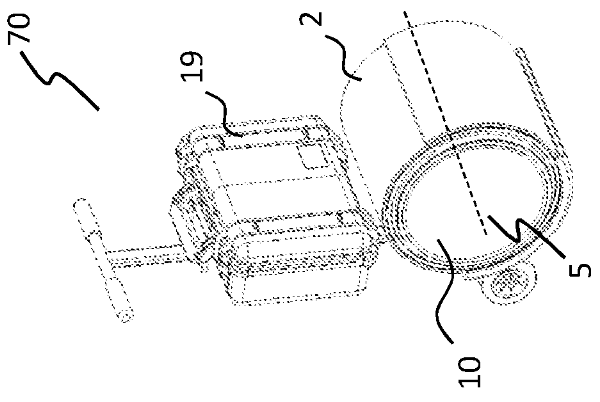
FIG. 12A-C illustrate antenna mat assemblies according to various embodiments of the invention.
Figure 12B:
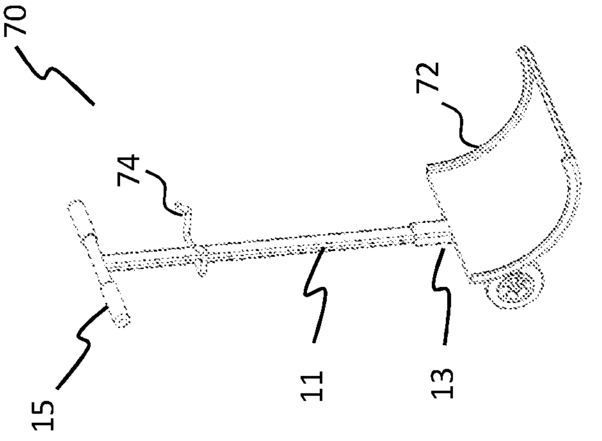
Figure 12C:
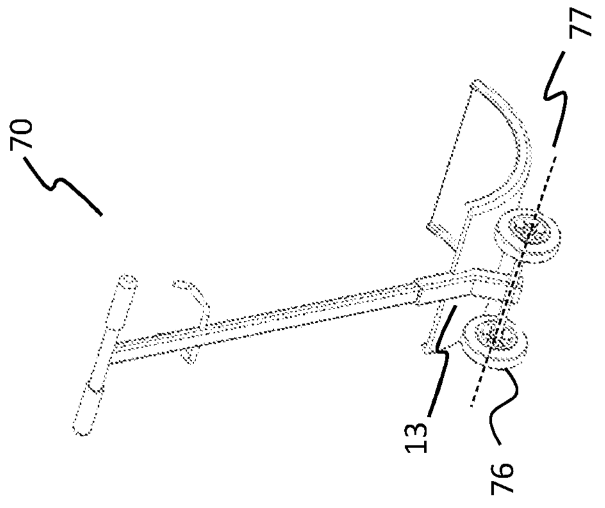

FIG. 12A-C illustrate antenna mat assemblies according to various embodiments of the invention. In particular, the antenna mat assembly may include an antenna mat in a rolled-up state positioned on a carrier, e.g. a hand truck or a dolly, 70 for transporting lifting and transporting an antenna mat roll. In the rolled-up state, the antenna mat may be wound around a cylindrical roll 10, preferably a hollow roll. In this state, the antenna mat wound around the roll may be referred to as an antenna mat roll.

As shown in the figures, the hand truck may include a shaft 11 wherein a first end of the shaft is connected to a base 13 and the second end of the shaft include one or more handles 15. As shown in FIGS. 12B and 12C, at least two wheels 76 and a ledge 72 may be connected to the base. In an embodiment, the ledge may be cylindrically curved this way the ledge may form a scoop for supporting part of the cylindrical surface of the antenna mat roll 2 (as shown in FIG. 12C). The cylindrical curvature of the ledge matches the cylindrical curvature of the antenna mat roll so that the ledge can be easily inserted underneath the antenna mat roll. This way, the shaft can be used to lift the antenna mat roll from the ground. The cylindrically curved ledge of the hand truck provides a stable support surface for carrying the antenna mat roll in an orientation wherein the roll axis of the antenna mat roll may be parallel to an axis 77 connecting the center of the wheels. This way, the antenna mat roll may be easily lifted and transported to a desired location. In an embodiment, the shaft may include a support structure 74 that can be used for supporting a separate box 19 comprising an antenna mat controller.

FIG. 13A-13D illustrate antenna mat assemblies according to various embodiments of the invention. In particular, the antenna mat assembly may include an antenna mat roll positioned on a carrier, e.g. a hand truck or a dolly, 80,82 for transporting lifting and transporting an antenna mat roll. As shown in the figures, also in these embodiments, the carrier may include a shaft 84 wherein a first end 85 of the shaft may be connected to a base. At least two wheels 90*a*,90*b* and a ledge 86 may be connected to the base, wherein the ledge is configured to support the antenna mat roll. The second end of the shaft may include one or more handles 88 allowing a user to handle the carrier. In this particular embodiment, the ledge may be structured as a rectangular tray where the shaft may be connected to a first side of the rectangular tray and wherein the at least two wheels may be connected to the tray such that the axis 91 connecting the center of the wheels is parallel to the first side of the tray.

In an embodiment, the antenna mat roll may be positioned in the tray such that the roll axis 94 of the antenna mat roll may be parallel to the axis 91 connecting the center of the two wheels. The tray may include rising edges 92*a*,92*b* positioned along the sides of the tray wherein the rising edges are configured to stop the antenna mat from sliding of the tray during transportation. In an embodiment, the height of one rising edge, e.g. the rising edge 92*b* at a second side opposite to the first side, may be lower than the height of the rising edges along the other (three) rising edges of the tray.

In an embodiment, a first frame structure 96*a* connected to the tray is positioned along a second side of the tray and a second frame structure 96*b* connected to the tray is positioned along a third side of the tray (opposite to the second side of the tray), wherein the second and third sides of the tray are perpendicular to the first side of the tray. The height of the first and second frame structure is higher that the height of the antenna mat roll positioned in the tray. Further, in an embodiment, the second end of the shaft may be connected to the base using a detachable connection structure. Thus, in this embodiment, the shaft may be detached resulting in an assembly comprising an antenna mat roll positioned in the tray including first and second frame structures, which enables a user to easily handle and lift the antenna mat roll.

Figure 13C:
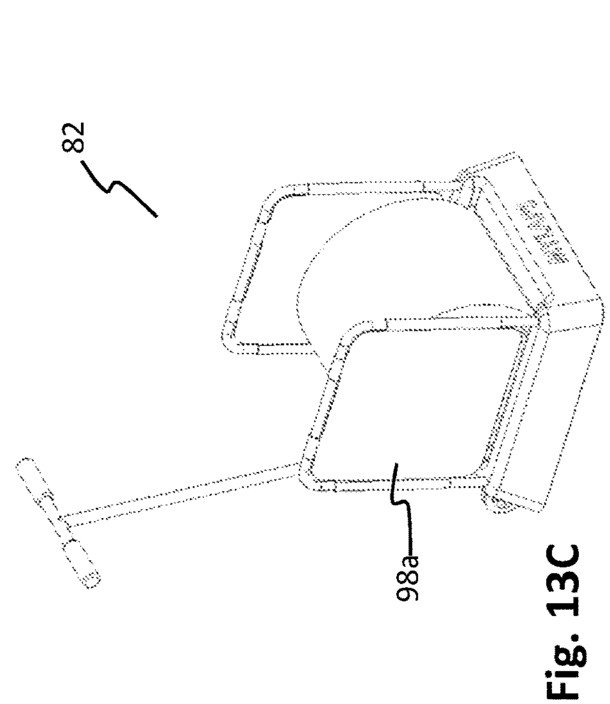
FIG. 13A-13D illustrate antenna mat assemblies according to various embodiments of the invention.
Figure 13D:
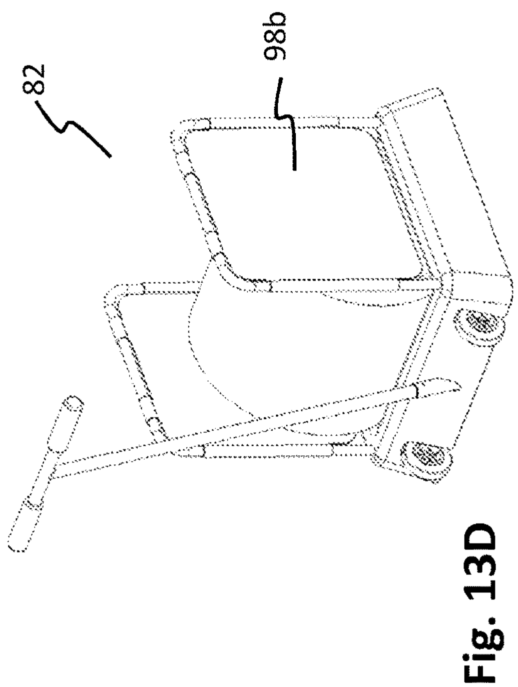
Figure 13A:
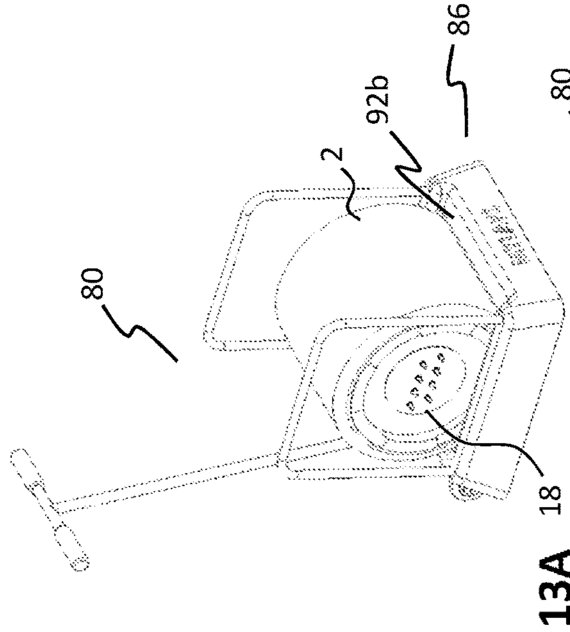
Figure 13B:
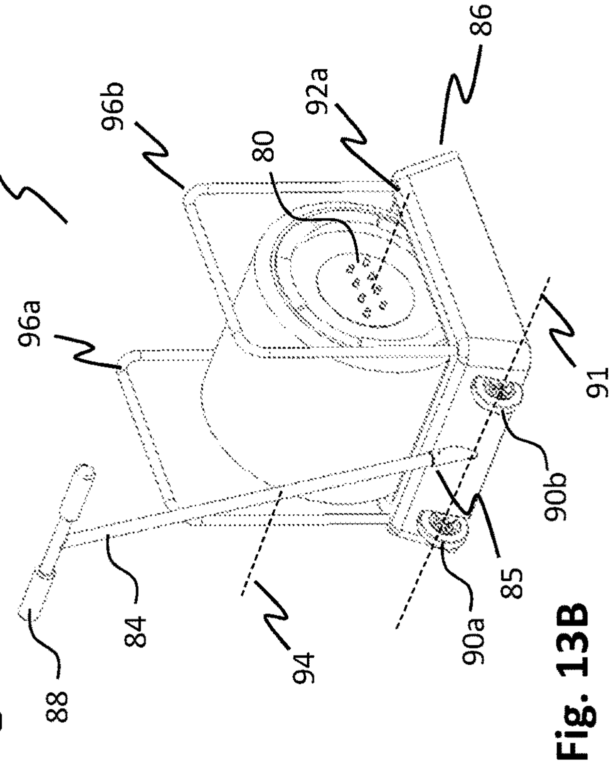

As shown in FIGS. 13C and 13D in an embodiment, the first and second frame structures may be a closed structure so that it can protect the sides of the antenna mat roll, which in some embodiment may include electrical UHF connectors and/or sports timing electronics including e.g. a controller, for electrically controlling the antenna mat.

Figure 14A:
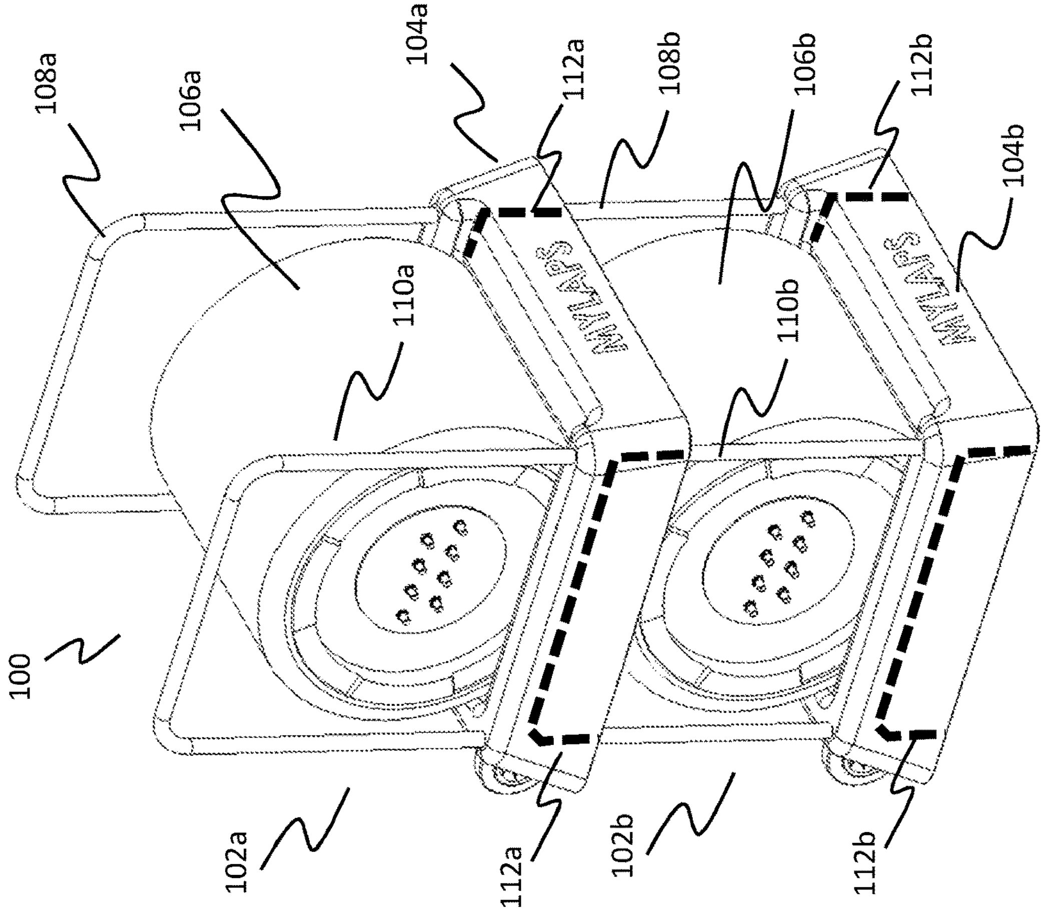
FIG. 14A-14B depict stackable antenna mat assemblies according to various embodiments of the invention.
Figure 14B:
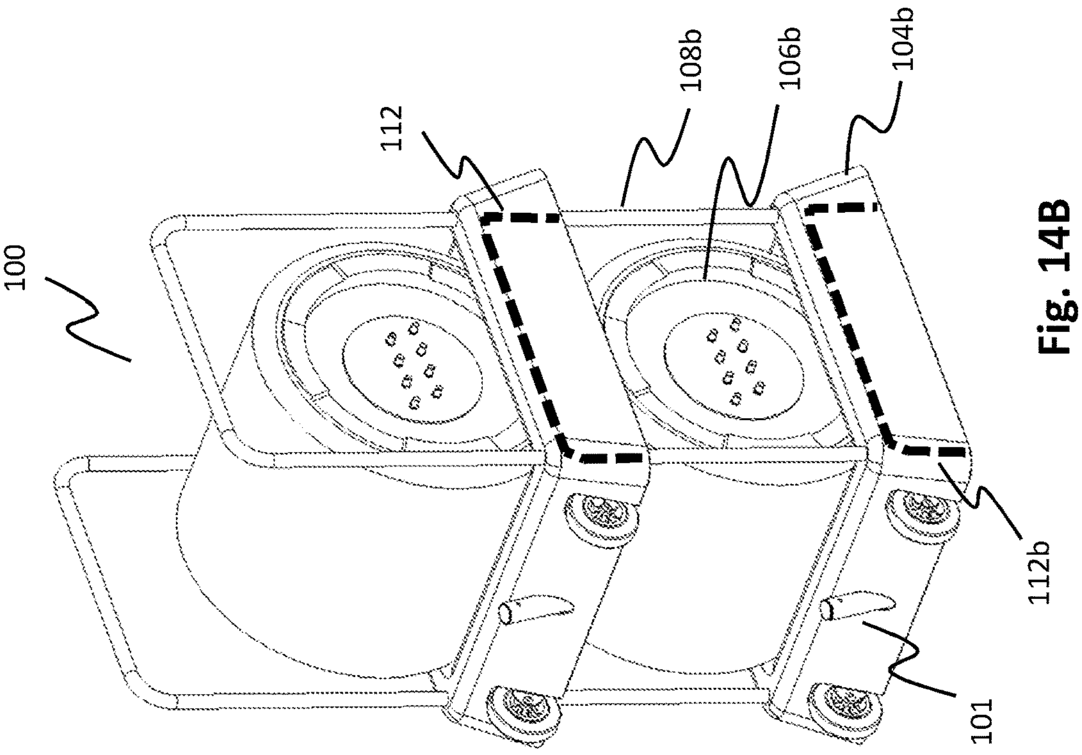

When removing the shaft of the antenna mat assembly as depicted in FIG. 13D, the resulting assembly comprising an antenna mat roll positioned in the tray including first and second frame structures, may be configured as a stackable antenna mat assembly. This is illustrated in more detail in FIG. 14A-14B, which depict stacked antenna mat assemblies according to various embodiments of the invention. In particular, these figures illustrate a stacked antenna mat assembly 100 comprising (in this particular case) a first stackable antenna mat assembly 102*a* and a second stackable antenna mat assembly 102*b*. Each stackable antenna mat assembly may include a tray structure (i.e. first tray structure 104*a* and second tray structure 104*b*) configured to support an antenna mat roll 106*a*,106*b* as described in detail with reference to FIG. 13A-13D.

The tray structure may be a substantially rectangular tray structure including four sides, wherein a first side may include a connector 101 for removably connecting a shaft connected to a handle (as described with reference to FIG. 13A-13D). Further, an antenna mat assembly may include a first frame structure 108*a*,108*b* connected to the tray, wherein the first frame structure is positioned along a second side of the tray, and a second frame structure 110*a*,110*b* connected to the tray which is positioned along a third side of the tray structure (opposite to the second side of the tray). As shown in these figures, the top part of the first and second frame structures 108*b*,110*b* of the second stackable antenna mat assembly may be shaped to engage with corresponding mechanical coupling parts 112*a* of the first tray structure of the first stackable antenna mat assembly. As shown in the figure, in an embodiment, the mechanical coupling parts may include a first recess and second recess 112*a* in the tray structure 104*a*. Thus, the antenna mat assemblies depicted in FIGS. 13 and 14 allow easy transportation, storage and installing and deinstalling of finish lines of a sports timing system of a sport event.

Figure 15:
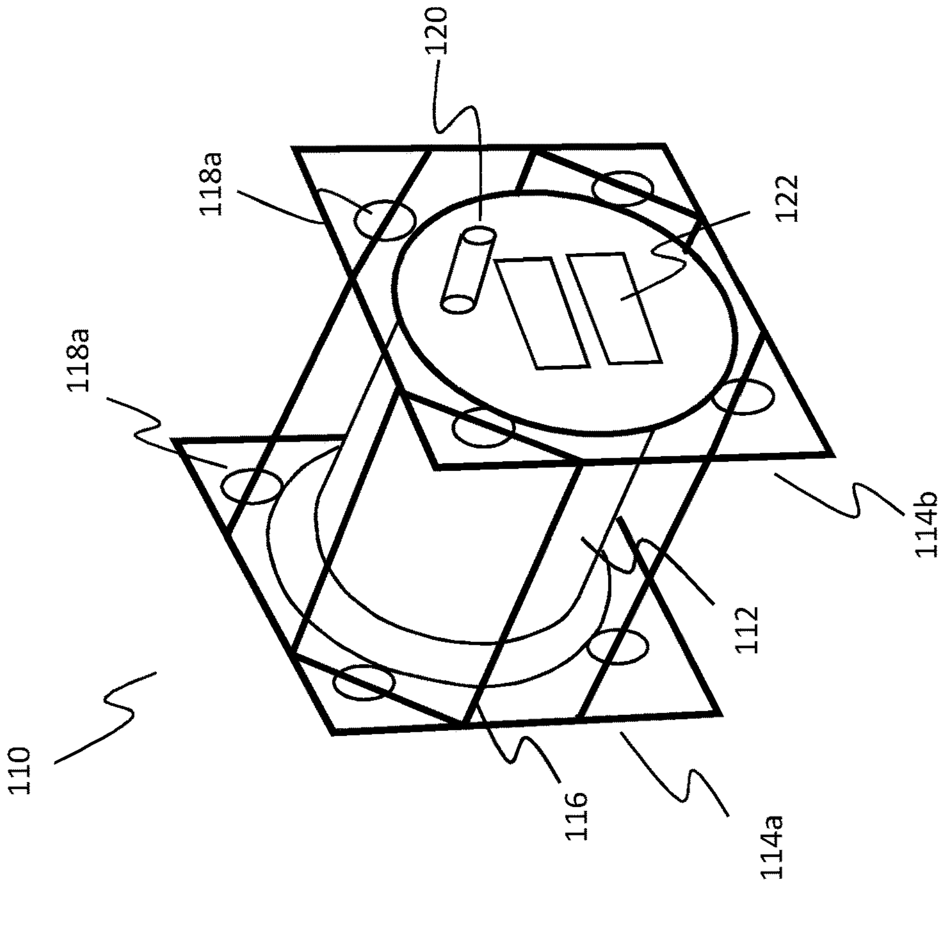
FIG. 15 depicts antenna mat assemblies according to another embodiment of the invention.

The structures and assemblies depicted in the figures are non-limiting and are used for illustrating the advantageous features and functionalities provided by the invention. Many other variants of the embodiments are possible without departing the essence of the invention. For example, FIG. 15 schematically depicts an embodiment of the invention including an antenna mat roll rotatable mounted in a reel or winder structure. The reel structure may include a frame, e.g. a tubular frame, in which the antenna mat roll is rotatable mounted. At least one of the side faces of the roll may include a handle 120 for rolling and unrolling the antenna mat. Further, in an embodiment, an antenna mat controller may be provided in the hollow space of the roll. A least one of the side faces of the roll may include at least one graphical user interface (GUI) of the antenna mat controller.

Figure 16A:
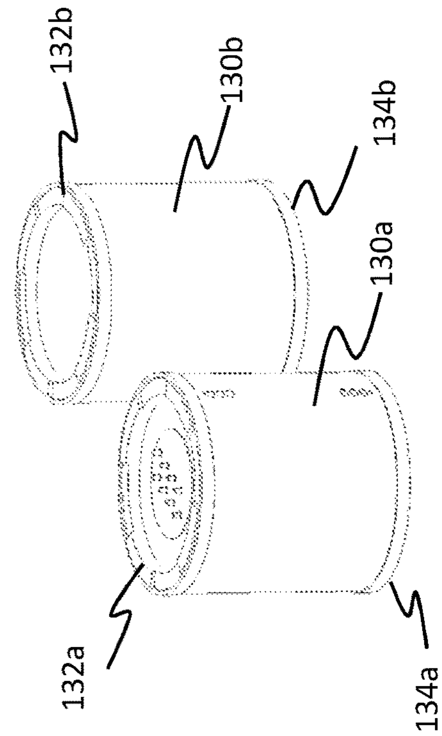
FIG. 16A-16C depict stackable antenna mat rolls according to an embodiment of the invention.
Figure 16C:
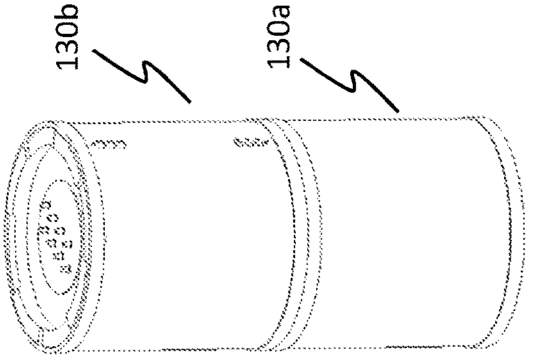
Figure 16B:
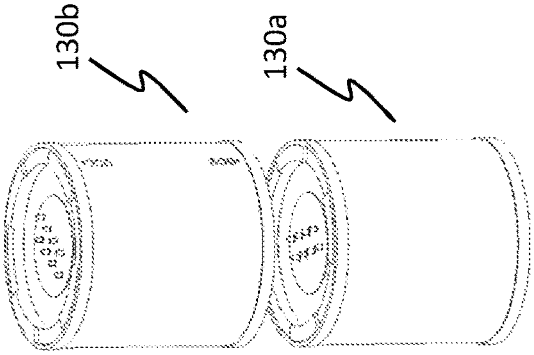

Similarly, FIG. 16A-16C depict stackable antenna mat roll structures according to an embodiment of the invention. In this embodiment, the roll structure 130*a*,130*b* of the antenna mat roll may include structured edges along the periphery of the basis of the cylindrical roll. For example, first roll structure 130*a* may include a first (top) edge 132*a* and a second (bottom) edge 134*a* and second roll structure 130*b* may include a first (top) edge 132*b* and a second (bottom) edge 134*b*. The edges may be structured so that the antenna mat rolls can be stacked as depicted in FIGS. 16B and 16C. For example, a first circular (top) edge of a first roll may include one or more recesses and a second circular (bottom) edge of a second roll may include one or more ledges which are configured to engage with the one or more recesses of the first roll. This way, when positioning the second roll structure on top of the first roll structure, the first edge structure of the first roll structure engages with the second edge structure of the second roll structure. Hence, this way, the antenna mat rolls can be stacked on top of each other with their cylindrical axis perpendicular to the ground surface.

Some embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1002 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A rollable antenna mat for sports timing comprising:

a plurality of planar ultra-high frequency antenna structures connected to ultra-high frequency coaxial transmission lines configured to convey signals to and/or from the planar ultra-high frequency antenna structures;

each of the planar ultra-high frequency antenna structures comprising at least one conductive plate positioned above a conductive ground plane, a spacer element positioned between the conductive ground plane and the conductive plate, each planar ultra-high frequency antenna structure being configured to generate a radiation field, the radiation field having a main axis that is substantially perpendicular to the conductive plate; and, the plurality of planar ultra-high frequency antenna structures and ultra-high frequency coaxial transmission lines being embedded in a flexible elongated sheet structure of one or more elastomeric materials, the flexible elongated sheet structure comprising the plurality of planar ultra-high frequency antenna structures and ultra-high frequency coaxial transmission lines being configured to be rolled up in a roll, an axis of the roll being substantially perpendicular to a longitudinal axis of the flexible elongated sheet structure.

2. The rollable antenna mat according to claim 1, wherein a length of the flexible elongated sheet structure is selected between 1 and 15 meter; and/or, wherein a width of the flexible elongated sheet structure is selected between 30 and 120 cm; and/or, wherein a maximal thickness of the flexible elongated sheet structure is selected between 2 and 6 cm; and/or, wherein length and width dimensions of the plurality of planar ultra-high frequency antenna structures are selected between 5 cm and 50 cm; and/or, wherein a diameter of the roll is selected between 100 and 25 cm.

3. The rollable antenna mat according to claim 1, wherein the spacer element comprises a honeycomb structure and/or, wherein the spacer element comprises a plastic material.

4. The rollable antenna mat according to claim 1, wherein the flexible elongated sheet structure comprises one or more laminated and/or bonded sheets of one or more flexible elastomeric materials, the flexible elongated sheet structure including at least a first sheet and a second sheet, wherein the plurality of planar ultra-high frequency antenna structures and the ultra-high frequency coaxial transmission lines are positioned between the first and second sheet.

5. The rollable antenna mat according to claim 4, wherein first sheet includes a first rubber material and/or, wherein the second sheet includes a second rubber material.

6. The rollable antenna mat according claim 4, wherein at least one of the first and second flexible sheet comprises a region having a honeycomb structure that is formed by a plurality of repeating units that each have a length and/or width between 5 and 10 mm, the repeating units including at least on of: hexagonal cells, triangular cells, square cells and/or combinations thereof.

7. The rollable antenna mat according to claim 4, wherein at least one of the first and second flexible sheet comprises one or more recessed spaces in the flexible material, the one or more recessed spaces being shaped for housing the plurality of planar ultra-high frequency antenna structures and the ultra-high frequency coaxial transmission lines.

8. The rollable antenna mat according to claim 1, wherein each of the ultra-high frequency coaxial transmission lines includes a signal line connected to the conductive plate and a ground line connected to the conductive ground plane.

9. The rollable antenna mat according to claim 8, wherein the signal line is connected to the conductive plate via a microstrip formed in the conductive plate.

10. The rollable antenna mat according to claim 1, wherein each of the ultra-high frequency coaxial transmission lines comprises: an inner conductor forming a signal line, an outer conductor around the inner conductor forming a ground line and a dielectric between the inner and outer conductor, the inner conductor being connected to the conductive plate and the outer conductor being connected to the conductive ground plane.

11. The rollable antenna mat according to claim 10, wherein an end part of the ultra-high frequency coaxial transmission line is oriented parallel to an edge of the planar ultra-high frequency antenna structure, the edge of the planar ultra-high frequency antenna structure being parallel to a roll axis of the roll.

12. The rollable antenna mat according to claim 10, wherein at a connection point between the inner conductor and the conductive plate, the inner conductor is oriented parallel to a roll axis of the rollable antenna mat.

13. The rollable antenna mat according to claim 1 and further comprising a test device, the test device being configured to receive a test signal from at least one of the planar ultra-high frequency antenna structures and/or to transmit a test signal to at least one of the planar ultra-high frequency antenna structures.

14. The rollable antenna mat according to claim 1, wherein a flexible conductive sheet is provided below the planar ultra-high frequency antenna structures for reducing signal dissipation into the ground when the rollable antenna mat is configured to be positioned across a race track.

15. The rollable antenna mat according to claim 1 and further comprising:

a cylindrically shaped roll element, the roll element having a curved surface wherein the rollable antenna mat is windable around the roll element.

16. The rollable antenna mat according to claim 15, wherein the rollable antenna mat is mechanically and electrically connectable to the roll element; and/or, the roll element comprising an antenna controller connected to the ultra-high frequency coaxial transmission lines of the rollable antenna mat.

17. The rollable antenna mat according to claim 1 and further comprising:

a carrier structure for transporting and lifting the roll.

18. The rollable antenna mat according to claim 17, wherein the carrier structure includes wheels.

19. The rollable antenna mat according to claim 1, wherein the spacer element provides a bending stiffness to the ultra-high frequency antenna structure so that in a rolled state the ultra-high frequency antenna structure bends slightly without damage and in an unrolled state the ultra-high frequency antenna structure retains its original planar shape.

* * * * *